(12) United States Patent
So et al.

(10) Patent No.: US 12,445,582 B2
(45) Date of Patent: Oct. 14, 2025

(54) ELECTRONIC DEVICE FOR DISPLAYING VISUAL OBJECT ASSOCIATED WITH ASPECT RATIO OF COMBINATIONS OF PROJECTION AREAS AND METHOD THEREOF

(71) Applicant: SAMSUNG ELECTRONICS CO., LTD., Suwon-si (KR)

(72) Inventors: Yongjin So, Suwon-si (KR); Jeongmin Son, Suwon-si (KR); Soungmin Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 18/372,536

(22) Filed: Sep. 25, 2023

(65) Prior Publication Data

US 2024/0214532 A1    Jun. 27, 2024

Related U.S. Application Data

(63) Continuation of application No. PCT/KR2023/013759, filed on Sep. 13, 2023.

(30) Foreign Application Priority Data

Dec. 27, 2022    (KR) .......................... 10-2022-0185529

(51) Int. Cl.
*H04N 9/31*    (2006.01)

(52) U.S. Cl.
CPC ................................. *H04N 9/3185* (2013.01)

(58) Field of Classification Search
CPC ... G06T 2207/30244; G06T 7/70; G06T 7/33; G06T 7/337; G06T 3/40; G06T 5/80;
(Continued)

(56) References Cited

U.S. PATENT DOCUMENTS 7,926,957 B2     4/2011  Miyazawa et al.
8,322,863 B1 *  12/2012  Cho ..................... H04N 9/3185
                                                       353/70
(Continued)

FOREIGN PATENT DOCUMENTS

JP          2009-5044 A       1/2009
JP          4304997 B2        5/2009
(Continued)

OTHER PUBLICATIONS

International Search Report dated Dec. 21, 2023, issued by the International Searching Authority in PCT/KR2023/013759.
(Continued)

*Primary Examiner* — John W Miller
*Assistant Examiner* — Humam M Satti
(74) *Attorney, Agent, or Firm* — Sughrue Mion, PLLC

(57) ABSTRACT

According to an embodiment, a processor of an electronic device identifies a combination of a first projection area for the electronic device and a second projection area for an external electronic device. The processor displays a portion of a visual object for guiding a reference aspect ratio in the first projection area. The portion is segmented from the visual object based on a location of the first projection area in the combination. The processor adjusts the portion, based on the motion of the electronic device. The processor displays, based on identification of an aspect ratio of the combination being corresponded to the reference aspect ratio, at least portion of media content having the reference aspect ratio in the first projection area.

20 Claims, 14 Drawing Sheets

(58) Field of Classification Search
CPC ....... G06T 7/60–68; G06T 2207/20212; G06T 2207/20221; G06T 2215/16; H04N 9/3194; H04N 9/3185; H04N 9/3147; H04N 9/3188; H04N 21/4314; H04N 21/4318; H04N 9/3155; G03B 21/147; G03B 21/2046; G03B 21/206; G03B 21/26; G03B 23/04; G03B 23/046; G03B 23/048; G03B 23/06

See application file for complete search history.

(56) References Cited

U.S. PATENT DOCUMENTS

| | | |
|---|---|---|
| 9,294,747 B2 | 3/2016 | Tanabe |
| 9,918,058 B2 | 3/2018 | Takahashi et al. |
| 10,250,857 B2 | 4/2019 | Kim et al. |
| 11,184,590 B2 | 11/2021 | Naganuma |
| 11,184,678 B2 | 11/2021 | Lee et al. |
| 11,202,044 B2 | 12/2021 | Katsuki et al. |
| 2009/0273540 A1* | 11/2009 | Schultz .................. H04N 23/54 345/1.3 |
| 2011/0321111 A1* | 12/2011 | Chae .................... H04N 9/3147 348/744 |
| 2012/0099081 A1 | 4/2012 | Huang et al. |
| 2013/0222386 A1* | 8/2013 | Tannhauser ............. G06T 11/00 345/428 |
| 2015/0244998 A1* | 8/2015 | Yanazume ........... H04N 9/3147 348/38 |
| 2018/0143008 A1* | 5/2018 | Morrison ........... G01B 11/2504 |
| 2019/0116356 A1 | 4/2019 | Matoba et al. |
| 2023/0031848 A1* | 2/2023 | Suzuki ................ H04N 9/3194 |
| 2023/0217075 A1 | 7/2023 | Seo |
| 2024/0146884 A1* | 5/2024 | Matsumoto .......... H04N 9/3185 |
| 2024/0146885 A1* | 5/2024 | Takeuchi ............. H04N 9/3185 |
| 2024/0146889 A1* | 5/2024 | Takeuchi ............. H04N 9/3147 |
| 2025/0068046 A1* | 2/2025 | Eum ..................... G03B 21/54 |

FOREIGN PATENT DOCUMENTS

| | | |
|---|---|---|
| JP | 2012-98621 A | 5/2012 |
| JP | 2017-191307 A | 10/2017 |
| KR | 10-0860186 B1 | 9/2008 |
| KR | 10-1273534 B1 | 6/2013 |
| KR | 10-2017-0044399 A | 4/2017 |
| KR | 10-1873814 B1 | 8/2018 |
| KR | 10-2160839 B1 | 9/2020 |
| KR | 10-2022-0040325 A | 3/2022 |
| KR | 10-2393297 B1 | 5/2022 |
| WO | 2016/002512 A1 | 1/2016 |
| WO | 2017/179272 A1 | 10/2017 |
| WO | 2018/216500 A1 | 11/2018 |

OTHER PUBLICATIONS

Written Opinion dated Dec. 21, 2023, issued by the International Searching Authority in PCT/KR2023/013759.

* cited by examiner and a second projection area. A processor may be configured to identify, based on an identification of an external electronic device through the communication circuit, a combination of a first projection area where light of the projection assembly is projected and a second projection area where light of the external electronic device is projected.

ELECTRONIC DEVICE FOR DISPLAYING VISUAL OBJECT ASSOCIATED WITH ASPECT RATIO OF COMBINATIONS OF PROJECTION AREAS AND METHOD THEREOF

CROSS-REFERENCE TO RELATED APPLICATIONS

This application is a continuation of PCT International Application No. PCT/KR2023/013759, which was filed on Sep. 13, 2023, and claims priority to Korean Patent Application No. 10-2022-0185529, filed on Dec. 27, 2022, in the Korean Intellectual Property Office, the disclosures of which are incorporated by reference herein their entirety.

BACKGROUND

1. Field

The disclosure relates to an electronic device for displaying a visual object associated with an aspect ratio of combinations of projection areas and a method thereof.

2. Description of Related Art

An electronic device for visualizing information is being developed. The electronic device may include a television, a monitor, an electronic display, a beam projector, a mobile phone, and/or a tablet personal computer (PC). The electronic device may form a projection area representing the information on one surface of the electronic device or on one surface outside the electronic device.

SUMMARY

According to an embodiment, an electronic device may comprise a sensor, a communication circuit, a projection assembly, and a processor. The processor may be configured to identify, based on an identification of an external electronic device through the communication circuit, a combination of a first projection area where light of the projection assembly is projected and a second projection area where light of the external electronic device is projected. The processor may be configured to display a portion of a visual object for guiding a reference aspect ratio in the first projection area. The portion may be segmented from the visual object based on a location of the first projection area in the combination. The processor may be configured to adjust, based on identifying a motion of the electronic device based on data of the sensor, the portion of the visual object displayed in the first projection area. The processor may be configured to display, based on identifying an aspect ratio of the combination corresponding to the reference aspect ratio, at least a portion of media content having the reference aspect ratio in the first projection area.

According to an embodiment, a method of an electronic device may comprise identifying, based on an identifying of an external electronic device through a communication circuit of the electronic device, a combination of a first projection area where light of a projection assembly of the electronic device is projected and a second projection area where light of the external electronic device is projected. The method may comprise displaying a portion of a visual object for guiding a reference aspect ratio in the first projection area. The portion may be segmented from the visual object based on a location of the first projection area in the combination. The method may comprise adjusting, based on identifying a motion of the electronic device based on data of a sensor of the electronic device, the portion of the visual object displayed in the first projection area. The method may comprise displaying, based on identifying an aspect ratio of the combination corresponding to the reference aspect ratio, at least a portion of media content having the reference aspect ratio in the first projection area.

According to an embodiment, an electronic device may comprise a sensor, a camera, a communication circuit, a projection assembly, and a processor. The processor may be configured to identify, based on an input for forming a projection area larger than a first projection area of the projection assembly, an external electronic device by using the communication circuit. The processor may be configured to obtain, based on the input, an image from the camera positioned toward a direction to which the projection assembly is directed. The processor may be configured to display, based on identifying a second projection area at least partially overlapped to the first projection area in the image, a first portion of a visual object for guiding a reference aspect ratio in the first projection area. The processor may be configured to adjust, based on a motion of the electronic device identified based on data of the sensor while displaying the first portion of the visual object, the first portion of the visual object displayed through the first projection area. The processor may be configured to display, based on identifying a projection area having the reference aspect ratio and formed by a combination of the first projection area and the second projection area, a portion of media content having the reference aspect ratio on the first projection area.

According to an embodiment, a method of an electronic device may comprise identifying, based on an input for forming a projection area larger than a first projection area of the projection assembly of the electronic device, an external electronic device by using the communication circuit of the electronic device. The method may comprise obtaining, based on the input, an image from the camera of the electronic device positioned toward a direction to which the projection assembly is directed. The method may comprise displaying, based on identifying a second projection area at least partially overlapped to the first projection area in the image, a first portion of a visual object for guiding a reference aspect ratio in the first projection area. The method may comprise adjusting, based on a motion of the electronic device identified based on data of the sensor of the electronic device while displaying the first portion of the visual object, the first portion of the visual object displayed through the first projection area. The method may comprise displaying, based on identifying a projection area having the reference aspect ratio and formed by a combination of the first projection area and the second projection area, a portion of media content having the reference aspect ratio on the first projection area.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
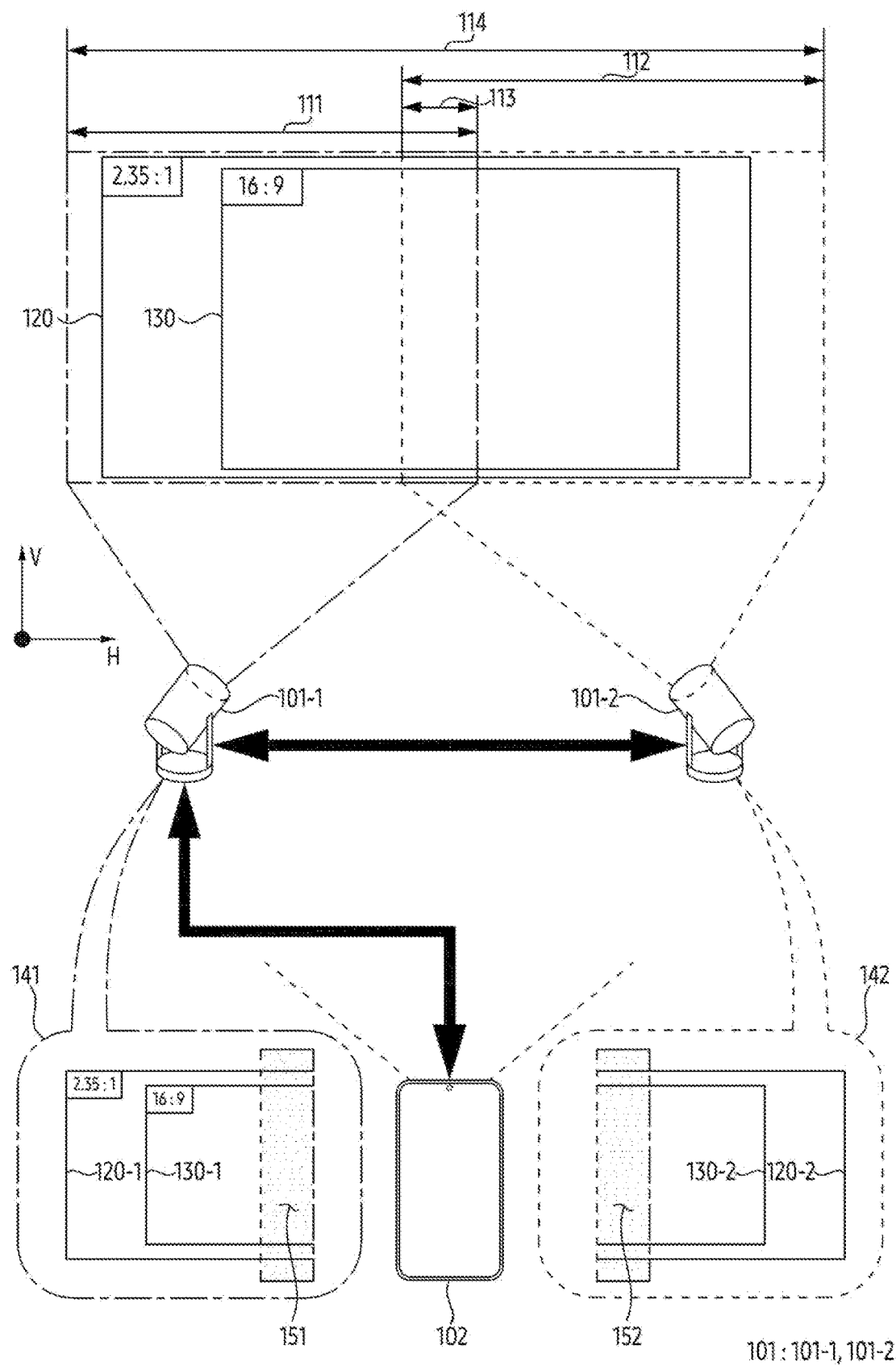
FIG. 1 illustrates an example of an operation in which an electronic device displays a visual object with respect to a reference aspect ratio, according to an embodiment.

Hereinafter, one or more embodiments of the present document will be described with reference to the accompanying drawings.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 illustrates an example of an operation in which an electronic device 101 displays a visual object (e.g., visual objects 120 and 130) with respect to a reference aspect ratio, according to an embodiment. Referring to FIG. 1, according to an embodiment, the electronic device 101 may include a beam projector for emitting light to an external space. The electronic device 101 may output the light representing a screen formed by two-dimensionally arranged pixels. The light representing the screen may be referred to as a beam. The light outputted from the electronic device 101 may be reflected from an external object (e.g., a plane or a screen). The user may view the screen based on the light reflected by the external object.

According to an embodiment, a screen represented by the light emitted from the electronic device 101 may be stored in a memory of the electronic device 101 or may be transmitted to the electronic device 101 from another electronic device (e.g., a terminal 102 that is a mobile phone, a set-top box (STB), a personal computer (PC), or a television (TV)). The media content may include an image and/or a video. The media content may be streamed from a network connected by the electronic device 101. The media content may include the video and a sound synchronized with the video. The media content may include a video standardized by a motion picture expert group (MPEG). The media content may include a screen displayed through a display of another electronic device (e.g., the terminal 102) that is distinct from the electronic device 101 based on mirroring.

According to an embodiment, the electronic device 101 may emit the light toward one direction. As the emitted light is projected onto the external object, a projection area may be formed on one surface of the external object. Referring to FIG. 1, a first projection area 111 formed by light emitted from a first electronic device 101-1 and a second projection area 112 formed by light emitted from a second electronic device 101-2 are illustrated. Depending on a position relationship between the first electronic device 101-1 and the second electronic device 101-2, the first projection area 111 and the second projection area 112 may at least partially overlap or be spaced apart from each other.

In an embodiment, the electronic device 101 may execute a function for expanding or merging projection areas, by communicating with an external electronic device that is the beam projector. In FIG. 1, the first electronic device 101-1 may identify a third projection area 114 formed by a combination of the first projection area 111 and the second projection area 112 based on identifying the second projection area 112 at least partially overlapping the first projection area 111. The first electronic device 101-1 that identified the third projection area 114 may use the entire third projection area 114, by communicating with the second electronic device 101-2 corresponding to the second projection area 112. For example, the first electronic device 101-1 may project a first portion of the media content to the first projection area 111 and may transmits a signal for displaying a second portion of the media content different from the first portion to the second electronic device 101-2, in order to display the media content on the entire third projection area 114. Based on that the second electronic device 101-2 that received the signal project the second portion to the second projection area 112, the first electronic device 101-1 may fill the third projection area 114 formed by the combination of the first projection area 111 and the second projection area 112 with the media content.

According to an embodiment, the first electronic device 101-1 may communicate with an electronic device including a camera, such as the terminal 102, in order to identify another projection area (e.g., the second projection area 112) connected to the first projection area 111. For example, the first electronic device 101-1 may receive an image including the first projection area 111 from the terminal 102. For example, from the image in which the external object (e.g., a wall surface or the screen) on which the first projection area 111 is formed is captured, the first electronic device 101-1 may identify the second projection area 112 at least partially overlapping the first projection area 111. The embodiment is not limited thereto, and the first electronic device 101-1 may include a camera positioned toward the first projection area 111. The first electronic device 101-1 may obtain an image including the first projection area 111 and/or the second projection area 112, by using the camera.

In an embodiment, the first electronic device 101-1 that identified the second projection area 112 connected to the first projection area 111 may identify the second electronic device 101-2 corresponding to the second projection area 112 among the electronic devices connected to the first electronic device 101-1. One or more hardware included in the electronic device 101 and/or the terminal 102 for communication between the beam projector and the mobile phone will be described with reference to FIG. 2.

According to an embodiment, the first electronic device 101-1 may perform a function for adjusting an aspect ratio of the third projection area 114 formed by the combination of the first projection area 111 and the second projection area 112. For example, the first electronic device 101-1 may display a visual object for modifying the aspect ratio of the third projection area 114, by projecting the light to the first projection area 111 and simultaneously controlling the second electronic device 101-2. Referring to FIG. 1, the visual objects 120 and 130 that the electronic device 101 displays to modify the aspect ratio of the third projection area 114 are illustrated. The visual object 120 having a rectangular shape with a width-to-height ratio (hereinafter referred to as the aspect ratio) of 2.35:1 and the visual object 130 having a rectangular shape with an aspect ratio of 16:9 are exemplarily illustrated, but the embodiment is not limited thereto.

According to an embodiment, the first electronic device 101-1 may communicate with the second electronic device 101-2, in order to display the visual object 120 larger than the first projection area 111. For example, the first electronic device 101-1 may transmit information for projecting a second portion 120-2 of the visual object 120 to the second electronic device 101-2, in a state in which a first portion 120-1 of the visual object 120 is projected in the first projection area 111. FIG. 1 illustrates a first beam 141 emitted by the first electronic device 101-1 and a second beam 142 emitted by the second electronic device 101-2. As the first electronic device 101-1 projects the first beam 141 including the first portion 120-1 of the visual object 120, the first portion 120-1 may be displayed in the first projection area 111 where the first beam 141 is projected. Similarly, as the second electronic device 101-2 projects the second beam 142 including the second portion 120-2 of the visual object 120, the second portion 120-2 may be displayed in the second projection area 112 where the second beam 142 is projected. In FIG. 1, the first electronic device 101-1 that projects the first beam 141 representing a first portion 130-1 of the visual object 130 into the first projection area 111 may transmit a signal for projecting the second beam 142 representing the second portion 130-2 of the visual object 130 to the second electronic device 101-2.

According to an embodiment, the first electronic device 101-1 may project the first portion 120-1 of the visual object 120 to the first projection area 111 and may communicate with the second electronic device 101-2 corresponding to the second projection area 112, in order to display the visual object 120 larger than the first projection area 111. Similarly, the first electronic device 101-1 may control the second electronic device 101-2 along with projecting the first beam 141 including the first portion 130-1 of the visual object 130 to the first projection area 111, in order to display the visual object 130 larger than the first projection area 111. The visual object 120 and/or the visual object 130 may be formed across an overlapping area 113, in the third projection area 114. The visual object 120 and/or the visual object 130 may be referred to as a screen ratio guide, in terms of guiding a width-to-height ratio of the third projection area 114.

In an embodiment, a visual object (e.g., the visual objects 120 and 130) for guiding the aspect ratio of the third projection area 114 may guide that a user looking at the third projection area 114 adjusts the aspect ratio of the third projection area 114 by moving and/or rotating the first electronic device 101-1 and/or the second electronic device 101-2. According to an embodiment, the first electronic device 101-1 may detect movement and/or rotation of the first electronic device 101-1 while projecting the first beam 141 including the first portions 120-1 and 130-1 of the visual objects 120 and 130. The first electronic device 101-1 may maintain the aspect ratio of the visual objects 120 and 130 projected to the third projection area 114 independently of the movement and/or rotation of the first electronic device 101-1. For example, the first electronic device 101-1 may modify the keystone of the first beam 141 based on the detected movement and/or rotation. The keystone is the shape of the outline of the first beam 141, and may be modified to adjust the shape of the screen (e.g., the screen of the first projection area 111) formed by the projection of the first beam 141. For example, the first electronic device 101-1 may modify the keystone of the first beam 141, in order to adjust the shape of the first projection area 111 to a rectangle. Based on the modification of the keystone, the shape of the outline of the first beam 141 may be modified in a rectangle including a rectangle, a trapezoid, and a parallelogram. In order to maintain the aspect ratio of the visual objects 120 and 130, the first electronic device 101-1 may warp the shape of the first portions 120-1 and 130-1 in the first beam 141 based on the detected movement and/or rotation.

In an embodiment, the second electronic device 101-2 controlled by the first electronic device 101-1 may modify the keystone of the second beam 142 and/or the second portions 120-2 and 130-2 included in the second beam 142, in response to the movement and/or rotation of the second electronic device 101-2. According to an embodiment, the operation performed by the first electronic device 101-1 to maintain the aspect ratio of the visual objects 120 and 130 independently of the movement and/or rotation of the first electronic device 101-1 will be described with reference to FIGS. 3A to 3C. Although two beam projectors (e.g., the first electronic device 101-1 and/or the second electronic device 101-2) are illustrated, the embodiment is not limited thereto. An operation in which two or more beam projectors display a visual object (e.g., the visual objects 120 and 130) guiding the reference aspect ratio will be described with reference to FIGS. 4A to 4D.

As described above with reference to FIG. 1, the first electronic device 101-1 and/or the second electronic device 101-2 may display the visual objects 120 and 130 for modifying the aspect ratio of the third projection area 114. The visual objects 120 and 130 may have different shapes, in order to guide different aspect ratios. In a case that it is identified that the aspect ratio of the third projection area 114 matches any one of the aspect ratios indicated by the visual objects 120 and 130, the first electronic device 101-1 may display the media content in the third projection area 114 together with the second electronic device 101-2. For example, the first electronic device 101-1 may selectively display the media content having the aspect ratio of the third projection area 114 or may display a user interface (UI) for recommending the media content. An example of an operation in which the first electronic device 101-1 displays the UI will be described with reference to FIGS. 5A to 5B.

In FIG. 1, since a portion of the first beam 141 and a portion of the second beam 142 are simultaneously projected toward the overlapping area 113 in which the first projection area 111 and the second projection area 112 overlap each other, an intensity of radiation in the overlapping area 113 may be greater than the intensity of radiation in an area different from the overlapping area 113 in the third projection area 114. For example, a user viewing the third projection area 114 may recognize that the overlapping area 113 is brighter. According to an embodiment, the first electronic device 101-1 may reduce the intensity of radiation of a portion 151 corresponding to the overlapping area 113 in the first beam 141 to less than the intensity of radiation of another portion, in order to reduce the intensity of radiation in the overlapping area 113. Similarly, the first electronic device 101-1 may reduce the intensity of radiation of a portion 152 corresponding to the overlapping area 113 in the second beam 142 to less than the intensity of radiation of another portion, by controlling the second electronic device 101-2. Based on reducing the intensity of radiation in the portions 151 and 152, the first electronic device 101-1 may make the distribution of the intensity of radiation of the entire third projection area 114 constant. Based on the distribution of the intensity of radiation, the first electronic device 101-1 may visualize a seamless combination of the projection areas (e.g., the first projection area 111 and the second projection area 112). The operation of partially controlling the brightness of the first beam 141 and/or the second beam 142 to adjust the intensity of radiation of the overlapping area 113 may be referred to as edge blending.

In the operation described above with reference to FIG. 1, the first electronic device 101-1 may be referred to as a master electronic device (or a master beam projector), in terms of controlling at least one other electronic device (e.g., the second electronic device 101-2). The other electronic device may be referred to as a slave electronic device (or a slave beam projector). According to an embodiment, the first electronic device 101-1 may scan another electronic device adjacent to the first electronic device 101-1, by using a wireless signal (e.g., a wireless signal in an ultra-wide band (UWB)). Based on identifying the second electronic device 101-2, the first electronic device 101-1 may display the visual objects 120 and 130 for guiding the reference aspect ratio in the third projection area 114, by controlling the second electronic device 101-2 as the master electronic device. An exemplary state in which the first electronic device 101-1, which is the master beam projector, communicates with one slave beam projector (e.g., the second electronic device 101-2) is illustrated, but the embodiment is not limited thereto. For example, the master beam projector may communicate with a plurality of slave beam projectors.

As described above, according to an embodiment, the beam projectors may form a projection area (e.g., the third projection area 114) larger than one projection area by connecting or merging a plurality of projection areas. Each of the beam projectors may display different portions of a visual object (e.g., the visual objects 120 and 130) having a reference aspect ratio, in order to modify the aspect ratio of a larger projection area. The beam projectors forming the larger projection area, such as the first electronic device 101-1 and/or the second electronic device 101-2 of FIG. 1, may have a master-slave relationship in the network.

Hereinafter, the one or more hardware included in the electronic device 101 according to an embodiment will be described with reference to FIG. 2.

Figure 2:
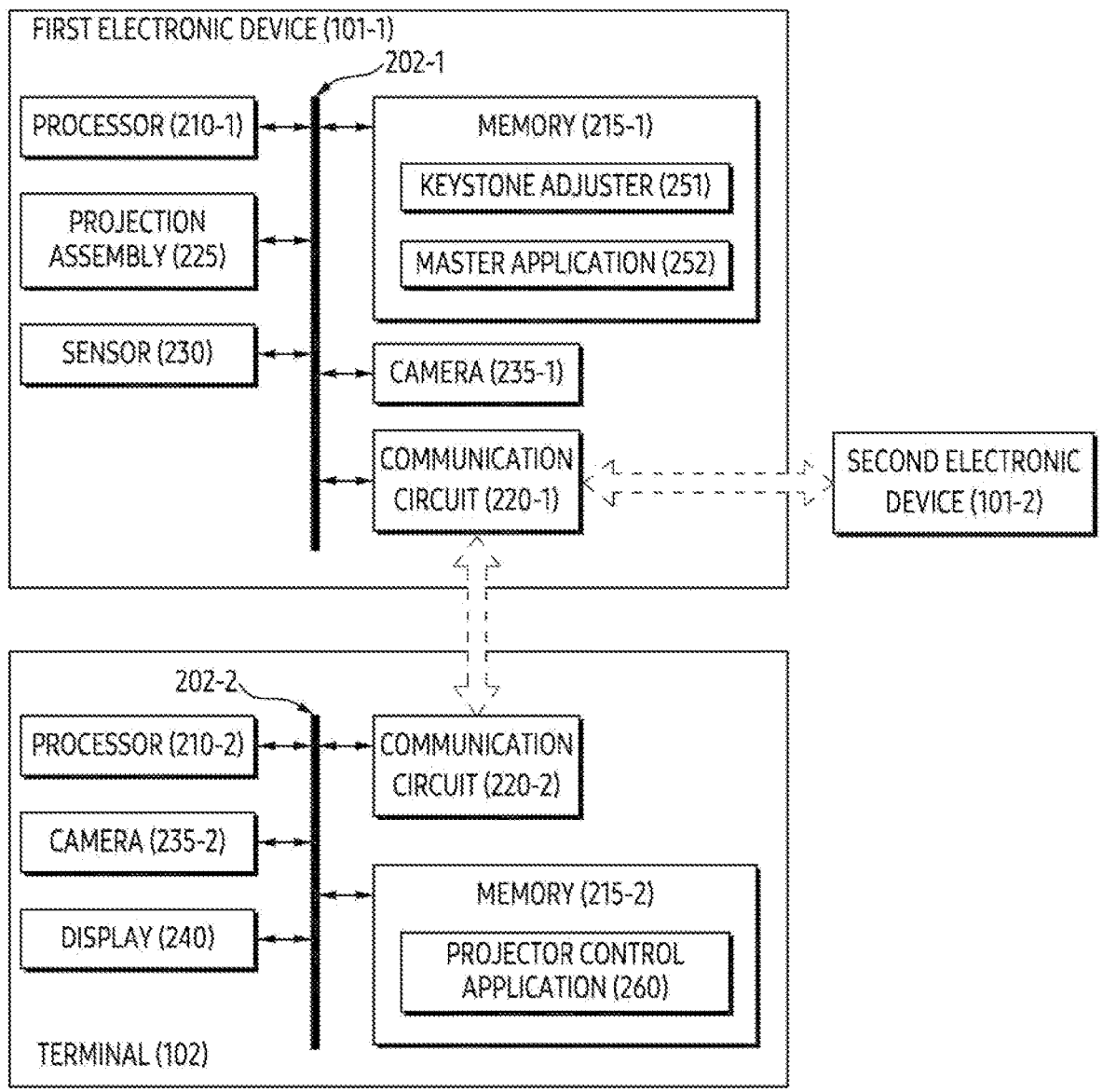
FIG. 2 illustrates an example of a block diagram of an electronic device according to an embodiment.

FIG. 2 illustrates an example of a block diagram of an electronic device 101 according to an embodiment. The electronic device 101 of FIG. 2 may include a beam projector of FIG. 1 (e.g., a first electronic device 101-1 and/or a second electronic device 101-2). FIG. 2 illustrates electronic devices (e.g., the first electronic device 101-1, the second electronic device 101-2 and/or a terminal 102) connected to each other based on a wired network and/or a wireless network. The wired network may include a network such as the Internet, a local area network (LAN), a wide area network (WAN), Ethernet, or a combination thereof. The wireless network may include a network such as long term evolution (LTE), 5G new radio (NR), wireless fidelity (WiFi), Zigbee, near field communication (NFC), Bluetooth, Bluetooth low-energy (BLE), or a combination thereof. Although the electronic devices of FIG. 2 are illustrated as being directly connected, the electronic devices may be indirectly connected through an intermediate node (e.g., a router and/or an access point (AP)).

Referring to FIG. 2, according to an embodiment, the first electronic device 101-1 may include at least one of a processor 210-1, a memory 215-1, a communication circuit 220-1, a projection assembly 225, a camera 235-1, or a sensor 230. The processor 210-1, the memory 215-1, the communication circuit 220-1, the projection assembly 225, the camera 235-1, and the sensor 230 may be electronically and/or operably coupled with each other by electronic components such as a communication bus 202-1. Hereinafter, that the hardware operably coupled with each other may mean that a direct connection or an indirect connection between hardware is established by wire or wirelessly so that a second hardware is controlled by a first hardware among the hardware. Although illustrated based on different blocks, the embodiment is not limited thereto, and a portion (e.g., at least a portion of the processor 210-1, the memory 215-1, and the communication circuit 220-1) of the hardware of FIG. 2 may be included in a single integrated circuit such as a system on a chip (SoC). The type and/or number of hardware components included in the electronic device 101 are not limited to the embodiment illustrated in FIG. 2. For example, the electronic device 101 may include only a portion of the hardware components illustrated in FIG. 2.

According to an embodiment, the processor 210-1 of the first electronic device 101-1 may include the hardware component for processing data based on one or more instructions. The hardware component for processing data may include, for example, an arithmetic and logic unit (ALU), a floating point unit (FPU), a field programmable gate array (FPGA), a central processing unit (CPU), and/or application processor (AP). The number of processors 210-1 may be one or more. For example, the processor 210-1 may have a structure of a multi-core processor such as a dual core, a quad core, or a hexa core.

According to an embodiment, the memory 215-1 of the first electronic device 101-1 may include the hardware component for storing data and/or instructions inputted and/or outputted to the processor 210-1. The memory 215-1 may include, for example, volatile memory such as random-access memory (RAM), and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, solid state drive (SSD) and an embedded multimedia card (eMMC).

According to an embodiment, in the memory 215-1 of the first electronic device 101-1, one or more instructions (or commands) indicating a calculation and/or operation to be performed by the processor 210-1 on data may be stored. A set of one or more instructions may be referred to as firmware, operating system, process, routine, sub-routine, and/or application. For example, the first electronic device 101-1 and/or the processor 210-1 may perform at least one of the operations of FIGS. 6 to 7 when a set of a plurality of instructions distributed in the form of the operating system, firmware, driver, and/or application is executed. Hereinafter, that the application is installed in the electronic device 101-1 means that the one or more instructions provided in the form of the application are stored in the memory 215-1 of the first electronic device 101-1, and the one or more applications are stored in an executable format (e.g., a file having an extension designated by the operating system of the first electronic device 101-1) by the processor 210-1 of the first electronic device 101-1.

According to an embodiment, the communication circuit 220-1 of the first electronic device 101-1 may include hardware for supporting the transmission and/or reception of electrical signals between the first electronic device 101-1 and an external electronic device (e.g., the second electronic device 101-2 and/or the terminal 102). As another electronic device connected through the communication circuit 220-1 of the first electronic device 101-1, only the second electronic device 101-2 and/or the terminal 102 are illustrated, but the embodiment is not limited thereto. The communication circuit 220-1 may include, for example, at least one of a modem, an antenna, and an optic/electronic (O/E) converter. The communication circuit 220-1 may support transmission and/or reception of the electrical signal based on various types of protocols such as Ethernet, local area network (LAN), wide area network (WAN), wireless fidelity (WiFi), Bluetooth, Bluetooth low energy (BLE), ZigBee, long term evolution (LTE), and 5G new radio (NR).

According to an embodiment, the first electronic device 101-1 may receive media content by using the communication circuit 220-1. For example, the first electronic device 101-1 wirelessly receive a signal for displaying the media content, based on a wireless communication protocol such as wireless display (WiDi) and/or Miracast through the communication circuit 220-1. For example, the first electronic device 101-1 may receive a signal for displaying the media content by wire, based on a wired communication protocol (or a wired interface) such as high-definition multimedia interface (HDMI), display port (DP), mobile high-definition link (MHL), digital visual interface (DVI), and/or D-subminiature (D-sub), by using the communication circuit 220-1.

According to an embodiment, the projection assembly 225 of the first electronic device 101-1 may include a plurality of hardware assembled to emit light (e.g., a first beam 141 and/or a second beam 142 of FIG. 1) representing pixels arranged in two dimensions. A method in which the projection assembly 225 emits light may include a digital light processing (DLP) method, a liquid crystal on silicon (LCOS) method, a liquid crystal display (LCD) method, a 3LCD method, or a laser method.

For example, the projection assembly 225 may include cathode-ray tubes (CRTs) for emitting light of each of the three primary colors in the color space, and a combination of lenses for enlarging the light emitted from each of the CRTs. For example, the projection assembly 225 implemented by the 3LCD method may include a combination of a light source (e.g., a lamp) for emitting the light, optical filters for segmenting the light into light paths corresponding to each of the three primary colors, liquid crystal display (LCD) panels positioned on each of the light paths, a prism and/or lenses for synthesizing light outputted from the LCD panels. For example, the projection assembly 225 implemented by the DLP method may include a combination of the light source for emitting the light, an optical filter for selecting one of the three primary colors from the light, a digital mirror device (DMD) for adjusting reflection to the primary color filtered by the optical filter, and lenses for enlarging the light reflected by the DMD. For example, the projection assembly 225 implemented by the laser method may include a combination of a light source for emitting laser light, an optical filter, an actuator for adjusting an optical path of the laser light filtered by the optical filter, and a hardware for reducing interference of the laser light such as speckle. In terms of requiring projection of the light for display of the screen, at least one of the above-exemplified combinations may be referred to as the projection assembly 225. In an embodiment, the first electronic device 101-1 including the projection assembly 225 may be referred to as the beam projector.

According to an embodiment, the sensor 230 of the first electronic device 101-1 may generates electronic information that may be processed by the processor 210-1 and/or memory 215-1 from non-electronic information associated with the first electronic device 101-1. For example, the sensor 230 may include a depth sensor for measuring a distance between the first electronic device 101-1 and an external object. The depth sensor may include an ultra-wide band (UWB) sensor (or UWB radar) that uses a wireless signal in a frequency band of a UWB. The depth sensor may include a time-of-flight (ToF) sensor that measures a ToF of the laser light and/or the infrared light. The first electronic device 101-1 may obtain a depth image including depth values arranged in two dimensions, by using the ToF sensor. The ToF sensor may include an infrared diode and a plurality of infrared light sensors that detect the intensity of infrared light and are positioned in a form of a 2 dimensional array. The first electronic device 101-1 may obtain the depth image based on the time when light emitted from the infrared diode is reflected from the subject and reaches at least one of the plurality of infrared light sensors, by using the ToF sensor. The depth image identified by the first electronic device 101-1 may be used to recognize an external object in which a projection area is formed and/or an external space including the external object. In addition to the depth sensor, the first electronic device 101-1 may include a global positioning system (GPS) sensor for detecting a geographic location of the first electronic device 101-1 (or a sensor based on a global navigation satellite system (GNSS) such as Galileo, Beidou, and compass), an image sensor for detecting electromagnetic waves including light, a touch sensor and/or an illuminance sensor.

According to an embodiment, the camera 235-1 of the first electronic device 101-1 may include one or more light sensors (e.g., a charged coupled device (CCD) sensor, a complementary metal oxide semiconductor (CMOS) sensor) that generate an electrical signal indicating color and/or brightness of light. A plurality of light sensors included in the camera 235-1 may be positioned in the form of the 2 dimensional array. The camera 235-1 may generate an image including a plurality of pixels arranged in 2 dimensions and corresponding to light reaching the light sensors of the 2 dimensional array, by obtaining the electrical signal of each of the plurality of light sensors substantially simultaneously. For example, photo data captured using the camera 235-1 may mean an image obtained from the camera 235-1. For example, video data captured using the camera 235-1 may mean a sequence of a plurality of images obtained from the camera 235-1 according to a designated frame rate. In an embodiment, the camera 235-1 of the first electronic device 101-1 may be arranged toward a direction in which the light of the projection assembly 225 is emitted, in a housing of the first electronic device 101-1. Since the direction of the camera 235-1 is parallel to the direction in which the light of the projection assembly 225 is emitted, the first electronic device 101-1 may identify an image of an external object to which light emitted from the projection assembly 225 is projected, by controlling the camera 235-1. For example, the first electronic device 101-1 may identify a projection area formed on one surface of the external object from the image.

According to an embodiment, the first electronic device 101-1 may include an output means for outputting information in a form other than a visualized form. For example, the first electronic device 101-1 may include a speaker for outputting an acoustic signal. For example, the first electronic device 101-1 may include a motor for providing haptic feedback based on vibration.

According to an embodiment, the first electronic device 101-1 may communicate with the second electronic device 101-2, by using the communication circuit 220-1. The second electronic device 101-2 may have the same form factor as the first electronic device 101-1 and may include the beam projector. For example, the second electronic device 101-2 may include one or more hardware (e.g., the processor 210-1, the memory 215-1, the communication circuit 220-1, the projection assembly 225, the sensor 230 and/or the camera 235-1) included in the first electronic device 101-1. The first electronic device 101-1 may establish a communication link with the second electronic device 101-2, by scanning another electronic device connected to one access point (AP) in the network. According to an embodiment, the first electronic device 101-1 may be wirelessly connected to the second electronic device 101-2 based on WiFi direct.

In an embodiment, the first electronic device 101-1 may communicate with an electronic device having another form factor distinct from the beam projector. In FIG. 2, the first electronic device 101-1 may be connected to the terminal 102. The terminal 102 of FIG. 2, like the terminal 102 of FIG. 1, may have the form factor of a mobile phone. The embodiment is not limited thereto. Referring to FIG. 2, the terminal 102 may include at least one of the processor 210-2, the memory 215-2, the communication circuit 220-2, the camera 235-2, or the display 240. The processor 210-2, the memory 215-2, the communication circuit 220-2, the camera 235-2 and the display 240 may be electronically and/or operably coupled with each other by a communication bus 202-2. The terminal 102 may include a personal computer (PC) such as a laptop and desktop, a smartphone, a smart pad, a tablet PC, a smart accessory such as a smartwatch, and a head-mounted device (HMD). The processor 210-2, the memory 215-2, the communication circuit 220-2, and the camera 235-2 in the terminal 102 of FIG. 2 may correspond to the processor 210-1, the memory 215-1, the communication circuit 220-1, and the camera 235-1 in the electronic device 101 of FIG. 2. In order to reduce the repetition of the description, among the descriptions of the processor 210-2, the memory 215-2, the communication circuit 220-2 and the camera 235-2 in the terminal 102, overlapping descriptions with the processor 210-1, the memory 215-1, the communication circuit 220-1, and the camera 235-1 in the electronic device 101 may be omitted.

Referring to FIG. 2, in the memory 215-1 of the first electronic device 101-1, one or more applications (e.g., a keystone adjuster 251 and/or a master application 252) for controlling another beam projector such as the projection assembly 225 and/or the second electronic device 101-2 of the first electronic device 101-1 may be installed. The processor 210-1 of the first electronic device 101-1 may adjust the shape (or outline) of the light (e.g., the first beam 141 of FIG. 1) emitted from the projection assembly 225, by executing the keystone adjuster 251. Based on the execution of the keystone adjuster 251, the processor 210-1 may identify parallel movement and/or rotational movement of the first electronic device 101-1 based on the data of the sensor 230. Based on the identification of the parallel movement and/or rotational movement, the first electronic device 101-1 may modify the shape of the light emitted from the projection assembly 225. In a state in which the keystone adjuster 251 is executed, the first electronic device 101-1 may obtain an image including a projection area (e.g., a first projection area 111 of FIG. 1) formed by the projection assembly 225. Based on the shape (or outline) of the projection area recognized through the image, the first electronic device 101-1 may modify the shape of the light emitted from the projection assembly 225. The image may be obtained by controlling the camera 235-1 in the first electronic device 101-1 or may be received from the terminal 102 through the communication circuit 220-1.

Referring to FIG. 2, a projector control application 260 for controlling the beam projector such as the first electronic device 101-1 may be installed, in the memory 215-2 of the terminal 102. The processor 210-2 of the terminal 102 may establish a communication link with the first electronic device 101-1, by executing the projector control application 260. Through the established communication link, the terminal 102 may transmit a signal for controlling the first electronic device 101-1 to the first electronic device 101-1. The signal is information processed by the keystone adjuster 251 of the first electronic device 101-1, and may include an image of the projection area formed by the projection assembly 225. The signal may include a command for executing the application (e.g., the keystone adjuster 251 and/or the master application 252) installed in the first electronic device 101-1. The signal may include a command for setting the first electronic device 101-1 as a master projector among the first electronic device 101-1 and the second electronic device 101-2. In response to the command for setting the first electronic device 101-1 as the master projector, the first electronic device 101-1 may execute the master application 252.

According to an embodiment, the processor 210-1 of the first electronic device 101-1 may form a third projection area having a reference aspect ratio by merging a first projection area (e.g., the first projection area 111 of FIG. 1) corresponding to the first electronic device 101-1 and a second projection area (e.g., the second projection area 112 of FIG. 1) corresponding to the second electronic device 101-2, based on the execution of the master application 252. For example, the first electronic device 101-1 may identify the beam projector such as the second electronic device 101-2, by using a communication circuit 220-1. In a state in which the second electronic device 101-2 is identified by using the communication circuit 220-1, the first electronic device 101-1 may identify a combination of the first projection area and the second projection area. For example, the first electronic device 101-1 may obtain an image including the third projection area (e.g., a third projection area 114 of FIG. 1) formed by the combination from the camera 235-1 and/or the camera 235-2 of the terminal 102. The terminal 102 may transmit a signal for executing the master application 252 to the first electronic device 101-1 by using the image obtained by the camera 235-2.

In an embodiment, in a state in which the master application 252 is executed, the first electronic device 101-1 may display a portion of a visual object for guiding the reference aspect ratio in the first projection area, by controlling the projection assembly 225. Substantially simultaneously with the control of the projection assembly 225, the first electronic device 101-1 may transmit a signal for displaying another portion of the visual object to the second electronic device 101-2 by using the communication circuit 220-1. The first electronic device 101-1 may segment a visual object having a rectangular shape having the reference aspect ratio, based on the locations of each of the first projection area and the second projection area, in the third projection area formed by the combination of the first projection area and the second projection area. Different portions of the segmented visual object may be projected to each of the first projection area corresponding to the first electronic device 101-1 and the second projection area corresponding to the second electronic device 101-2.

In a state in which at least a portion of the visual object for guiding the reference aspect ratio is displayed, the first electronic device 101-1 may identify a motion of the first electronic device 101-1 based on the execution of the keystone adjuster 251. For example, in a case that the user moves or rotates the first electronic device 101-1, the first electronic device 101-1 may identify the motion. Based on the identified motion, the first electronic device 101-1 may move, rotate, or warp the portion of the visual object projected through the projection assembly 225. For example, the first electronic device 101-1 may modify the portion of the visual object so that the portion of the visual object has a fixed shape in the first projection area of the projection assembly 225. The second electronic device 101-2 that displayed the other portion of the visual object for guiding the reference aspect ratio may also identify the motion of the second electronic device 101-2, in order to display the other portion having a fixed shape in the second projection area formed by the projection assembly of the second electronic device 101-2.

For example, in a case that the keystone adjuster 251 is deactivated, or the keystone adjuster 251 is not installed in the first electronic device 101-1, the first electronic device 101-1 may display the visual object for guiding the reference aspect ratio based on the execution of the master application 252. For example, the user may adjust the projection portions of the first electronic device 101-1 and the second electronic device 101-2, by manually modifying the first electronic device 101-1 and/or the second electronic device 101-2. In the above example, the user may display the visual object having the reference aspect ratio in the adjusted projection areas, by executing the master application 252 of the first electronic device 101-1. In the above example, the first electronic device 101-1 may display a first portion of the visual object having the reference aspect ratio in the first projection area formed by the first electronic device 101-1 and may display a second portion of the visual object in the second projection area formed by the second electronic device 101-2, based on the execution of the master application 252. Based on edge blending, the first portion and the second portion of the visual object may overlap each other in an overlapping area in which the projection areas overlap.

According to an embodiment, the first electronic device 101-1 may identify whether the aspect ratio of the third projection area formed by the combination of the first projection area and the second projection area has the reference aspect ratio, by communicating with the second electronic device 101-2. In a state in which different portions of the visual object for guiding the reference aspect ratio are displayed, the first electronic device 101-1 may identify whether the visual object matches the third projection area. For example, the first electronic device 101-1 may identify a difference between the outline of the first projection area and the portion of the visual object projected on the first projection area. Based on the information obtained from the second electronic device 101-2, the first electronic device 101-1 may identify a difference between the outline of the second projection area and the other portion of the visual object projected on the second projection area. Based on the above differences, the first electronic device 101-1 may identify whether the aspect ratio of the third projection area matches the reference aspect ratio.

In an embodiment, based on identifying that the aspect ratio of the third projection area formed by the combination of the first projection area and the second projection area corresponds to the reference aspect ratio, the first electronic device 101-1 may display media content having the reference aspect ratio in the third projection area together with the second electronic device 101-2. For example, the first electronic device 101-1 may project a first portion of the media content to the first projection area, by using the projection assembly 225. In a state in which the first portion of the media content is projected to the first projection area, the first electronic device 101-1 may transmit information on the second portion of the media content to the second electronic device 101-2. In the state in which the first portion is projected to the first projection portion, the second electronic device 101-2 may project the second portion of the media content to the second projection area based on the information. For example, different portions (e.g., the first portion and the second portion) of the media content may be displayed through different beam projectors (e.g., the first electronic device 101-1 and/or the second electronic device 101-2). In a case that the third projection area has the reference aspect ratio, the first electronic device 101-1 may display a user interface (UI) for recommending playback of the media content having the reference aspect ratio.

As described above, according to an embodiment, the electronic device 101 may create a projection area having a larger size than a projection area that may be formed by one electronic device 101, by communicating with the external electronic device. For example, the first electronic device 101-1 may obtain information used to identify the aspect ratio of the projection area from the terminal 102 and/or the camera 235-1. Based on the information, the first electronic device 101-1 may cause projection areas of the first electronic device 101-1 to the second electronic device 101-2 to be combined based on the reference aspect ratio, by controlling both the projection assembly 225 of the first electronic device 101-1 and the projection assembly of the second electronic device 101-2. For example, the first electronic device 101-1 may display a visual object (e.g., a guideline of a rectangle) for guiding the reference aspect ratio in the projection areas, by using both the projection assembly 225 of the first electronic device 101-1 and the projection assembly of the second electronic device 101-2.

Hereinafter, with reference to FIGS. 3A to 3C, according to an embodiment, an example of an operation in which the first electronic device 101-1 displays the visual object having the reference aspect ratio together with the second electronic device 101-2 will be described.

Figure 3A:
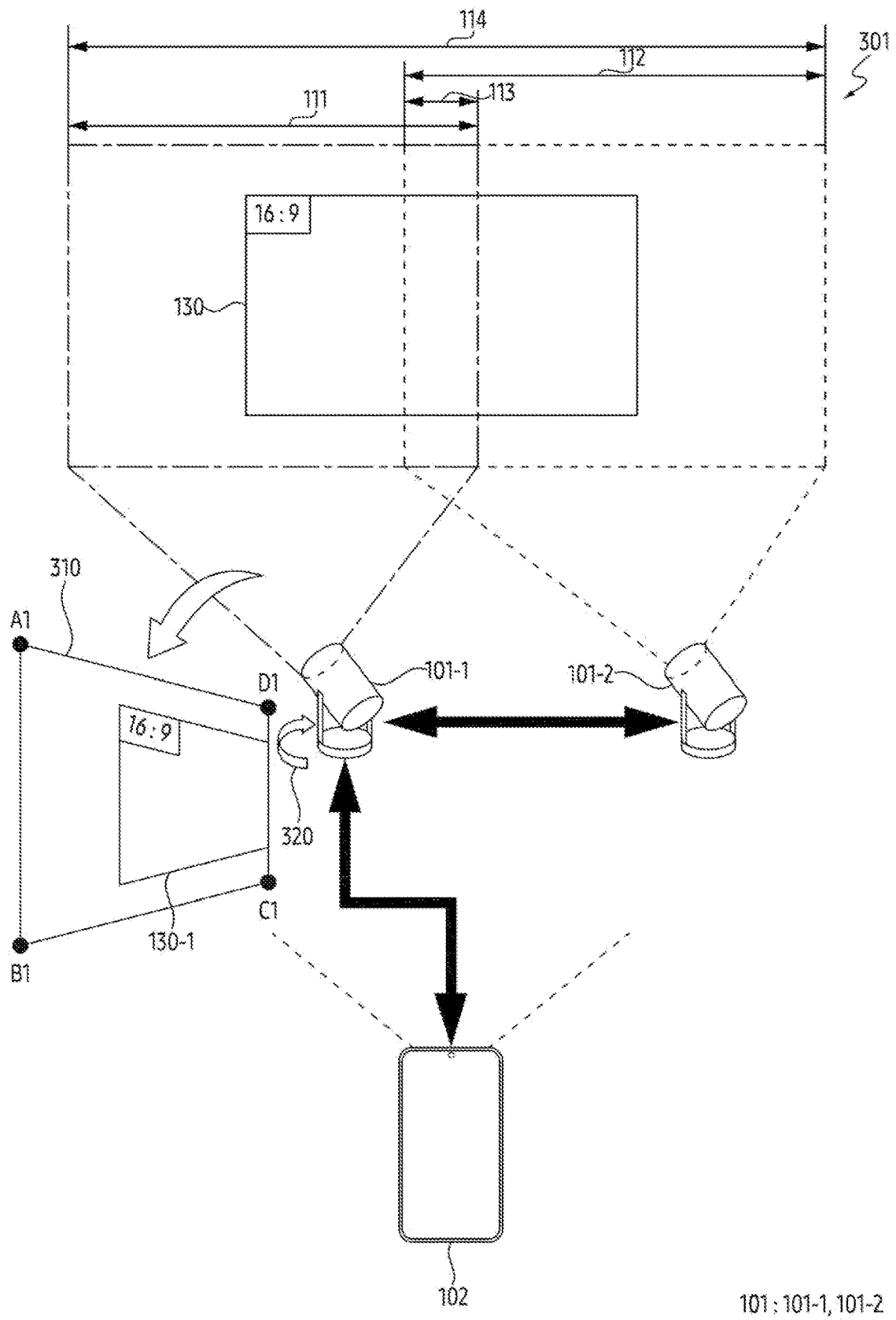
FIGS. 3A, 3B, and 3C illustrate an example of an operation in which an electronic device modifies at least a portion of a visual object displayed through a projection area according to an embodiment.
Figure 3B:
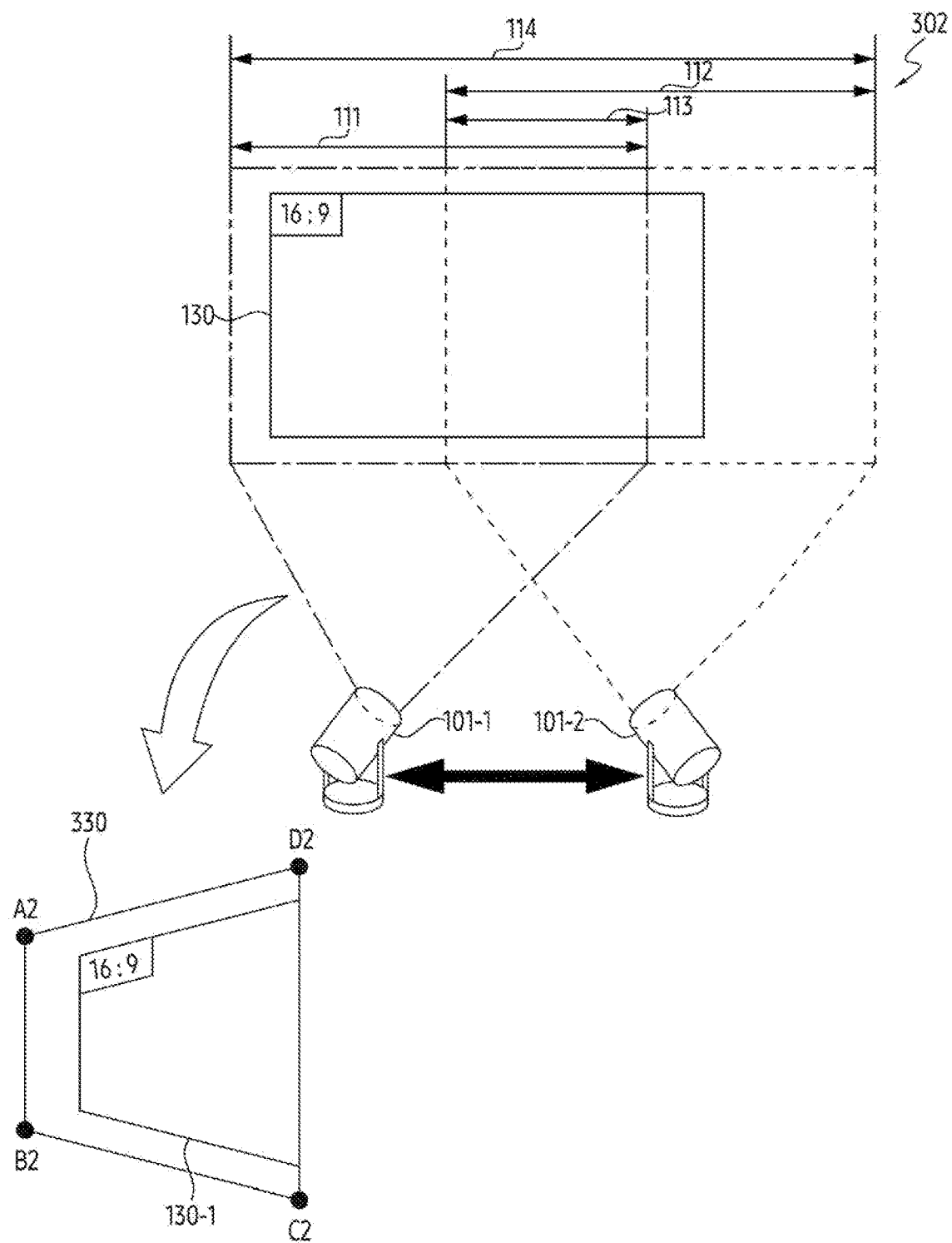
Figure 3C:
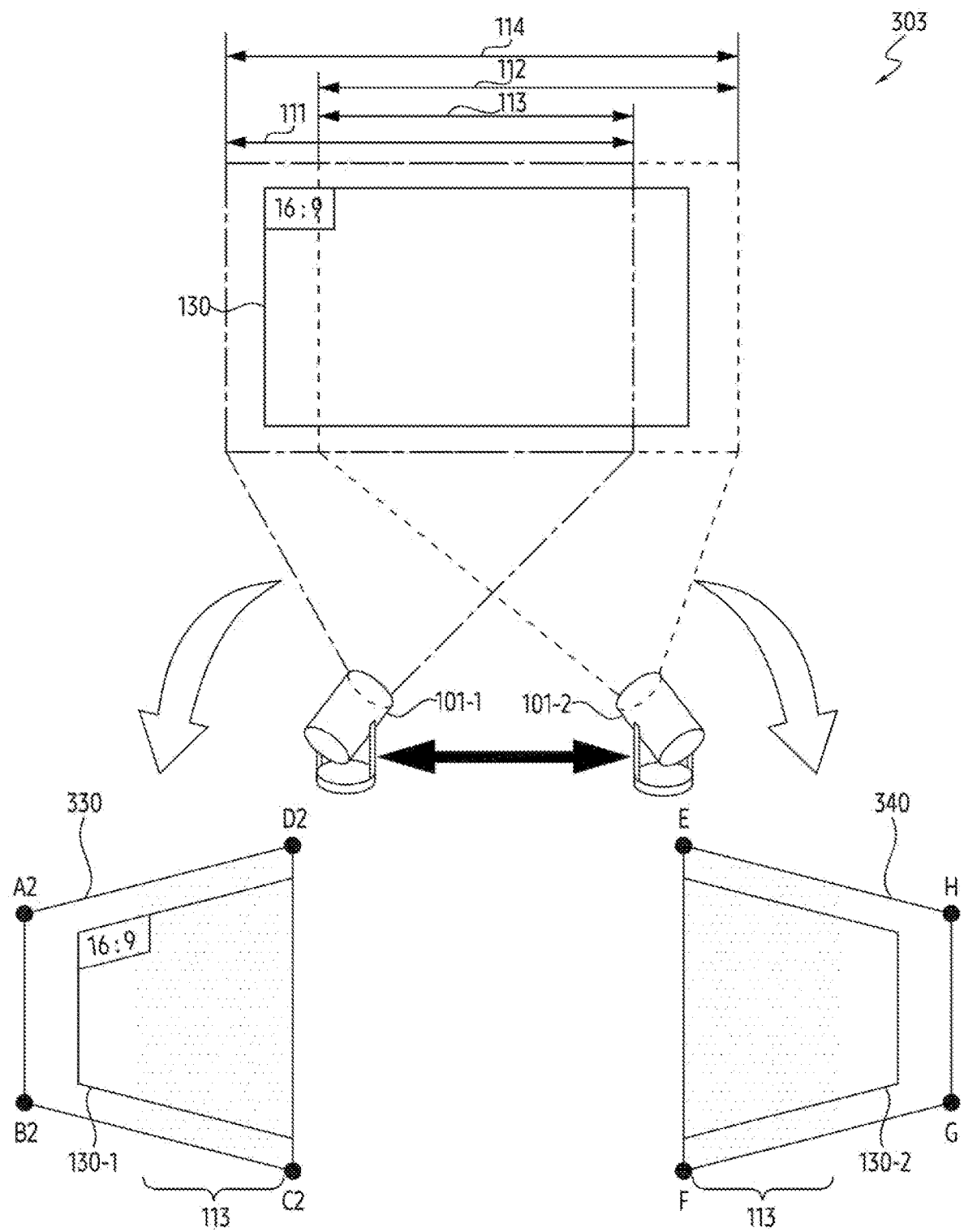

FIGS. 3A to 3C illustrate an example of an operation in which an electronic device 101 modifies at least a portion of a visual object 130 displayed through a projection area according to an embodiment. The electronic device 101 of FIGS. 1 to 2 may include the electronic device 101 of FIGS. 3A to 3C. A first electronic device 101-1 and a second electronic device 101-2 of FIGS. 3A to 3C may include the first electronic device 101-1 and the second electronic device 101-2 of FIGS. 1 to 2.

In FIGS. 3A to 3C, states 301 and 302 before a state 303 forming the projection area having a reference aspect ratio are exemplarily illustrated. In order to form the projection area, the first electronic device 101-1 may communicate with the second electronic device 101-2. In the state 301 of FIG. 3A, according to an embodiment, the first electronic device 101-1 may identify an input for increasing a size of the projection area for displaying media content to a size greater than a size of a first projection area 111 of the first electronic device 101-1. For example, the first electronic device 101-1 may identify an input for forming a projection area larger than the first projection area 111. The input may be received through at least one of a button included in the first electronic device 101-1, a remote controller connected to the first electronic device 101-1, a voice command (e.g., an audio signal including a natural language sentence such as "Let's merge projection areas") identified by the first electronic device 101-1, and/or an application (e.g., a projector control application 260 of FIG. 2) executed by the terminal 102. Based on the input, the first electronic device 101-1 may initiate identifying the second electronic device 101-2. For example, the first electronic device 101-1 may identify at least one slave beam projector to be controlled by the first electronic device 101-1, which is a master beam projector.

In an embodiment, in response to the input for increasing the size of the projection area, the first electronic device 101-1 may obtain an image associated with the first projection area 111 formed by the first electronic device 101-1. The first electronic device 101-1 may obtain an image including the first projection area 111, by using a camera (e.g., cameras 235-1 and 235-2 of FIG. 2). Based on the image, the first electronic device 101-1 may identify a second projection area 112 at least partially overlapping the first projection area 111. In FIG. 3A, in the state 301, the first electronic device 101-1 may identify the first projection area 111 and the second projection area 112 connected to each other in an overlapping area 113. In response to the input, the first electronic device 101-1 may execute a function for merging the first projection area 111 and the second projection area 112. The function may include an operation of displaying the visual object 130 for guiding the reference aspect ratio. The function may be executed by a master application (e.g., a master application 252 of FIG. 2) installed in the first electronic device 101-1.

In FIG. 3A, according to an embodiment, the first electronic device 101-1 may display the visual object 130 for guiding the reference aspect ratio in a third projection area 114 formed by a combination of the first projection area 111 and the second projection area 112. The exemplary state 301 in which a rectangular visual object 130 having a reference aspect ratio of 16:9 is projected is illustrated, but the embodiment is not limited thereto. The first electronic device 101-1 may transmit information for projecting a second portion of the visual object 130 to the second electronic device 101-2, while projecting a first portion of the visual object 130 onto the first projection area 111 by using a projection assembly (e.g., a projection assembly 225 of FIG. 2) of the first electronic device 101-1. The first portion and the second portion of the visual object 130 may be selected or segmented by the location of the overlapping area 113 in the third projection area 114. The visual object 130 may have a maximized rectangular shape having the reference aspect ratio in the third projection area 114. The center of the visual object 130 may coincide with the center of the third projection area 114.

According to an embodiment, the first electronic device 101-1 may adjust the keystone of the first projection area 111, in order to make the visual object 130 visible through the third projection area 114 into a rectangular shape. For example, the first electronic device 101-1 may adjust the shape of the first projection area 111 to a rectangle based on the execution of a keystone adjuster (e.g., the keystone adjuster 251 of FIG. 2). In the state 301 of FIG. 3A, the first electronic device 101-1 may output a beam 310 including a first portion 130-1 of the visual object 130 to the first projection area 111. The beam 310 may have a trapezoidal shape in which a first line connecting the points A1 and B1 and a second line connecting the points C1 and D1 are parallel to each other. The first electronic device 101-1 may determine the shape of the beam 310 based on the angle between one surface of an external object on which the first projection area 111 is formed and the projection assembly of the first electronic device 101-1. For example, the first electronic device 101-1 may make the length of the first line longer than the length of the second line, in the state 301 in which the distance between the first line and the external object is greater than the distance between the second line and the external object by the angle. Another electronic device (e.g., the second electronic device 101-2) that received a signal for at least partially displaying the visual object 130 from the first electronic device 101-1 may also display at least a portion of the visual object 130 having the rectangular shape, by adjusting the keystone.

In the state 301 of FIG. 3A, the first electronic device 101-1 may identify motion of the first electronic device 101-1. For example, a user viewing the visual object 130 having the rectangular shape formed in the third projection area 114 may rotate or move the first electronic device 101-1 and/or the second electronic device 101-2, in order to modify the shape of the third projection area 114 to the rectangular shape guided by the visual object 130. In order to maintain the shape of the visual object 130 independently of the rotation and/or movement, the first electronic device 101-1 and/or the second electronic device 101-2 may modify the keystone.

In FIG. 3A, the first electronic device 101-1 identifies a motion of rotating the first electronic device 101-1 along a direction 320, while displaying the first portion 130-1 of the visual object 130. In response to the motion, the first electronic device 101-1 may modify the first portion 130-1 of the visual object 130 displayed through the first projection area 111. For example, the first electronic device 101-1 may switch from the state 301 to the state 302 of FIG. 3B by modifying the keystone of the first portion 130-1.

In FIG. 3B, the first electronic device 101-1 may output a beam 330 that is distinct from the beam 310 of the state 301. Based on the angle between the first projection area 111 on which the beam 310 is projected and the projection assembly of the first electronic device 101-1, the first electronic device 101-1 may make a length of a first line between the points A2 and B2 shorter than a length of a second line between the points C2 and D2. By using the beam 330 including the first line longer than the second line, the first electronic device 101-1 may maintain the shape of the first portion 130-1 of the visual object 130 in the rectangular shape independently of the modification of the angle. Similarly, the second electronic device 101-2 that displays the second portion at least partially overlapping the first portion 130-1 of the visual object 130 may also modify the shape (e.g., the keystone) of the beam toward the second projection area 112, based on the movement and/or rotation of the second electronic device 101-2.

In the state 303 of FIG. 3C, an aspect ratio of the third projection area 114 may match a reference aspect ratio of the visual object 130. Since the visual object 130 has the shape of a maximized rectangle having the reference aspect ratio in the state 301, the third projection area 114 having the reference aspect ratio may be matched with the visual object 130 having the reference aspect ratio. For example, an interval between the third projection area 114 and the visual object 130 may be reduced to less than a designated interval. According to an embodiment, the first electronic device 101-1 may monitor the aspect ratio of the third projection area 114, based on an image including the third projection area 114 and/or information for adjusting the keystone of the first electronic device 101-1 and/or the second electronic device 101-2. Based on identifying that the aspect ratio of the monitored third projection area 114 matches the reference aspect ratio of the visual object 130, the first electronic device 101-1 may execute a function for displaying a UI (or media content) based on the reference aspect ratio, by using the third projection area 114 having the reference aspect ratio.

In FIG. 3C, according to an embodiment, the beam 330 emitted from the first electronic device 101-1 to the first projection area 111 and a beam 340 emitted from the second electronic device 101-2 to the second projection area 112 are exemplarily illustrated. Each of the beams 330 and 340 may have a trapezoidal shape in order to make the shape of the third projection area 114 rectangular. According to an embodiment, the first electronic device 101-1 may execute a function of making the distribution of brightness uniform in the third projection area 114, such as edge blending, based on identifying that the aspect ratio of the third projection area 114 matches the reference aspect ratio. For example, the first electronic device 101-1 may make the brightness of the overlapping area 113 darker than the brightness of another portion in the beam 330. For example, the second electronic device 101-2 may make the brightness of the overlapping area 113 darker than the brightness of another portion in the beam 340.

In the state 303 of forming a third projection area 114 which is based on the combination of the first projection area 111 and the second projection area 112 and has the reference aspect ratio, according to an embodiment, the first electronic device 101-1 may display the UI having the reference aspect ratio on the third projection area 114. The UI may be provided by an application executed by the first electronic device 101-1 or may include media content received by the first electronic device 101-1. In a state in which the first portion of the media content is displayed on the first projection area 111, the first electronic device 101-1 may transmit information for displaying the second portion of the media content on the second projection area 112 to the second electronic device 101-2. By using different projection areas, the first electronic device 101-1 may display the media content having the reference aspect ratio.

Although an exemplary case of identifying a motion in which the first electronic device 101-1 rotates the first electronic device 101-1 has been described, the embodiment is not limited thereto. In an embodiment in which the first electronic device 101-1 is implemented independently of the keystone adjuster (e.g., the keystone adjuster 251 of FIG. 2), the first electronic device 101-1 may display the visual object 130, in response to receiving an input for displaying the visual object 130. For example, the first electronic device 101-1 may display the visual object 130, based on a position relationship between the first electronic device 101-1 and the second electronic device 101-2 at the timing of receiving the input.

As described above, according to an embodiment, the first electronic device 101-1 may identify the second projection area 112 connected to the first projection area 111 of the first electronic device 101-1 and may control the second electronic device 101-2 that generated the second projection area 112, by executing a function associated with the master beam projector. The first electronic device 101-1 may transmit the visual object 130 for adjusting the aspect ratio of the third projection area 114 in which the first projection area 111 and the second projection area 112 are combined, to one or more second electronic devices. The first electronic device 101-1 may identify the modification of the aspect ratio of the third projection area 114, as the user viewing the first electronic device 101-1 and the second electronic device 101-2 moves the first electronic device 101-1 and 101-2 based on the visual object 130. In a case that the modified aspect ratio of the third projection area 114 has a reference aspect ratio corresponding to the visual object 130, the first electronic device 101-1 may at least temporarily cease displaying the visual object 130. For example, the first electronic device 101-1 may replace the visual object 130 with the UI having the reference aspect ratio. By using the visual object 130 for modifying the aspect ratio of the third projection area 114 to the reference aspect ratio, the first electronic device 101-1 may make the user more accurately modify the aspect ratio independently of the user directly measuring the aspect ratio.

Hereinafter, according to an embodiment, different examples in which the first electronic device 101-1 forms the projection area based on the reference aspect ratio will be described according to an embodiment will be described with reference to FIGS. 4A to 4C.

Figure 4A:
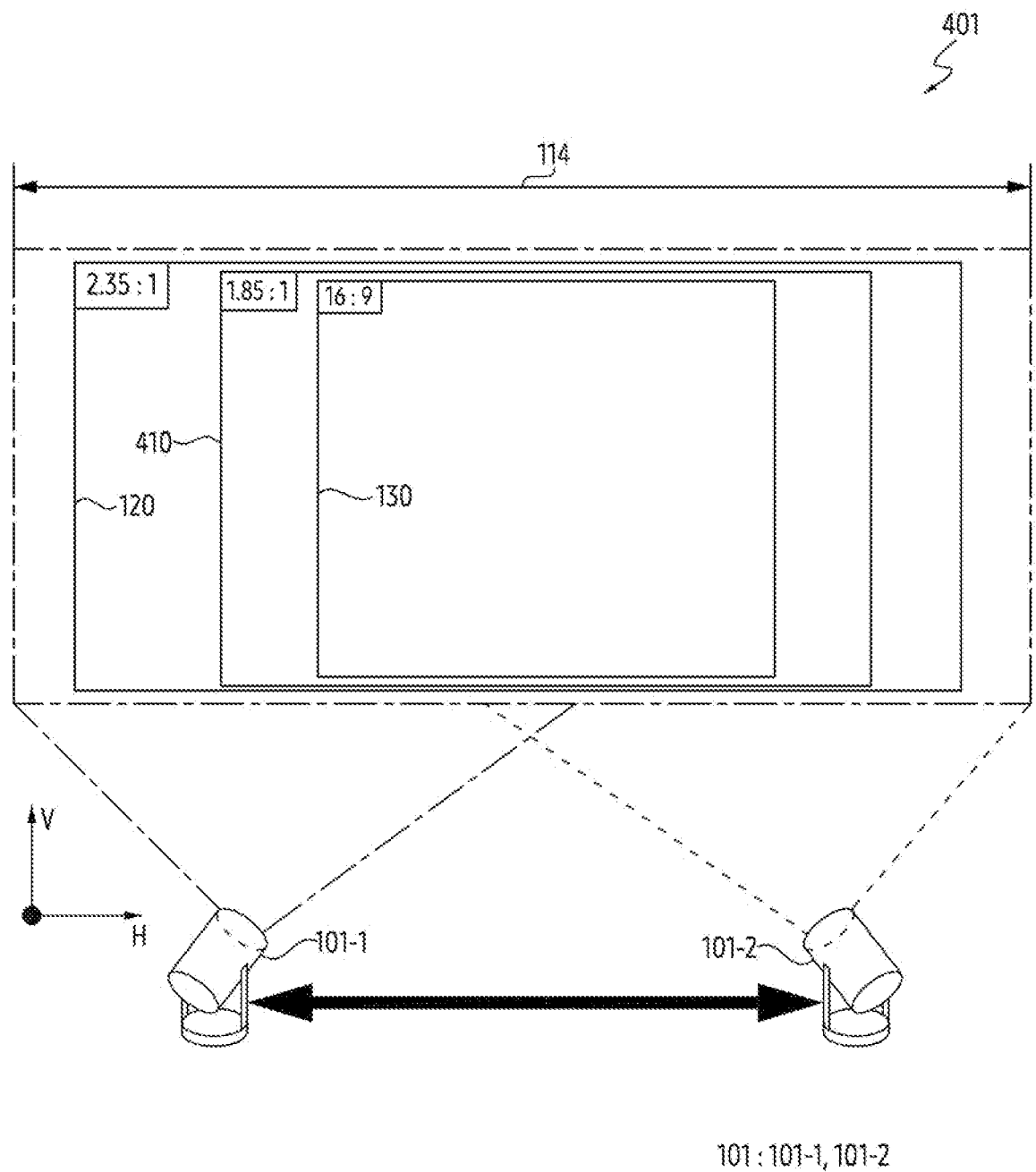
FIGS. 4A, 4B, 4C and 4D illustrate an example of an operation in which an electronic device generates a projection area larger than a projection area formed by the electronic device by communicating with at least one external electronic device, according to an embodiment.
Figure 4B:
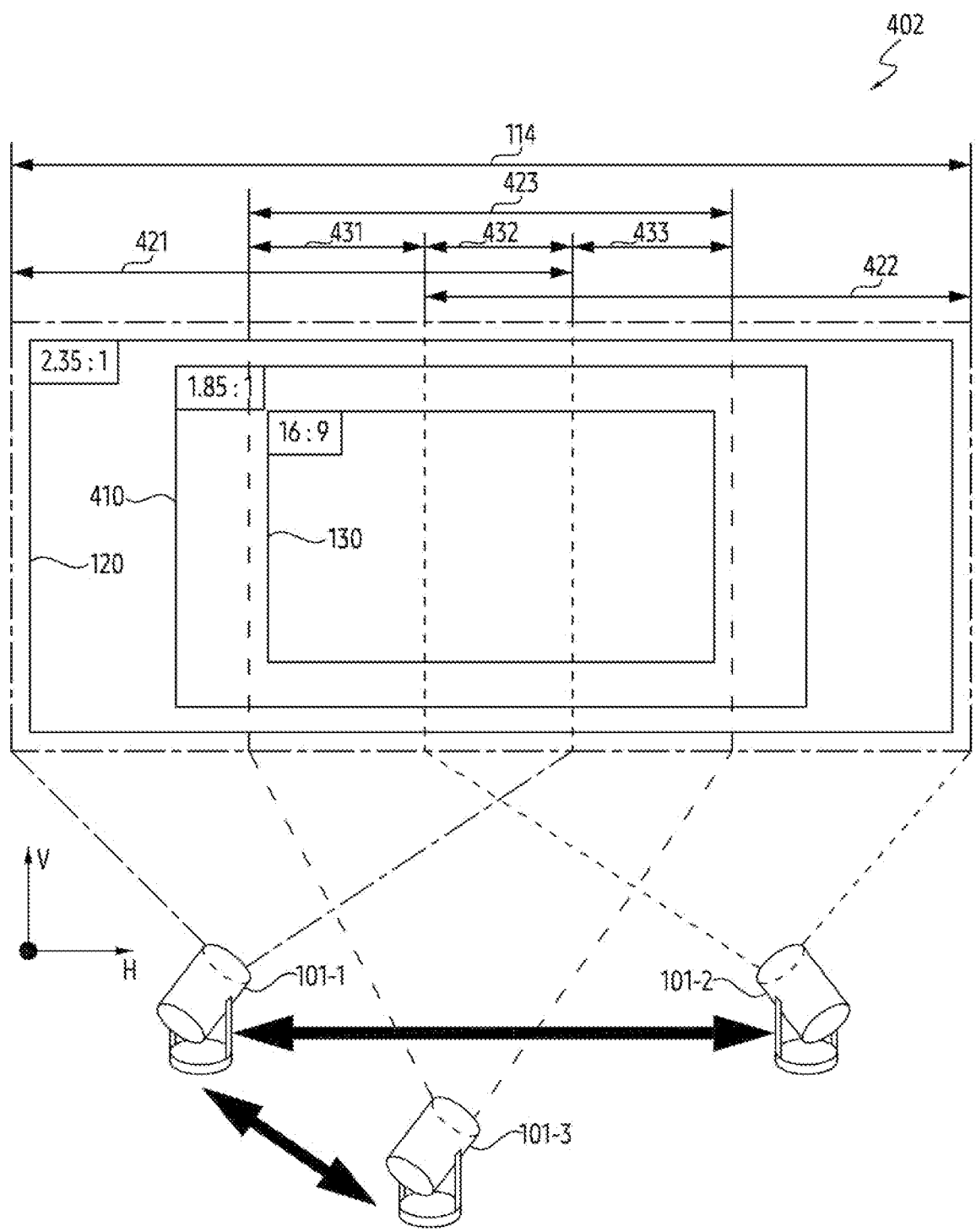
Figure 4C:
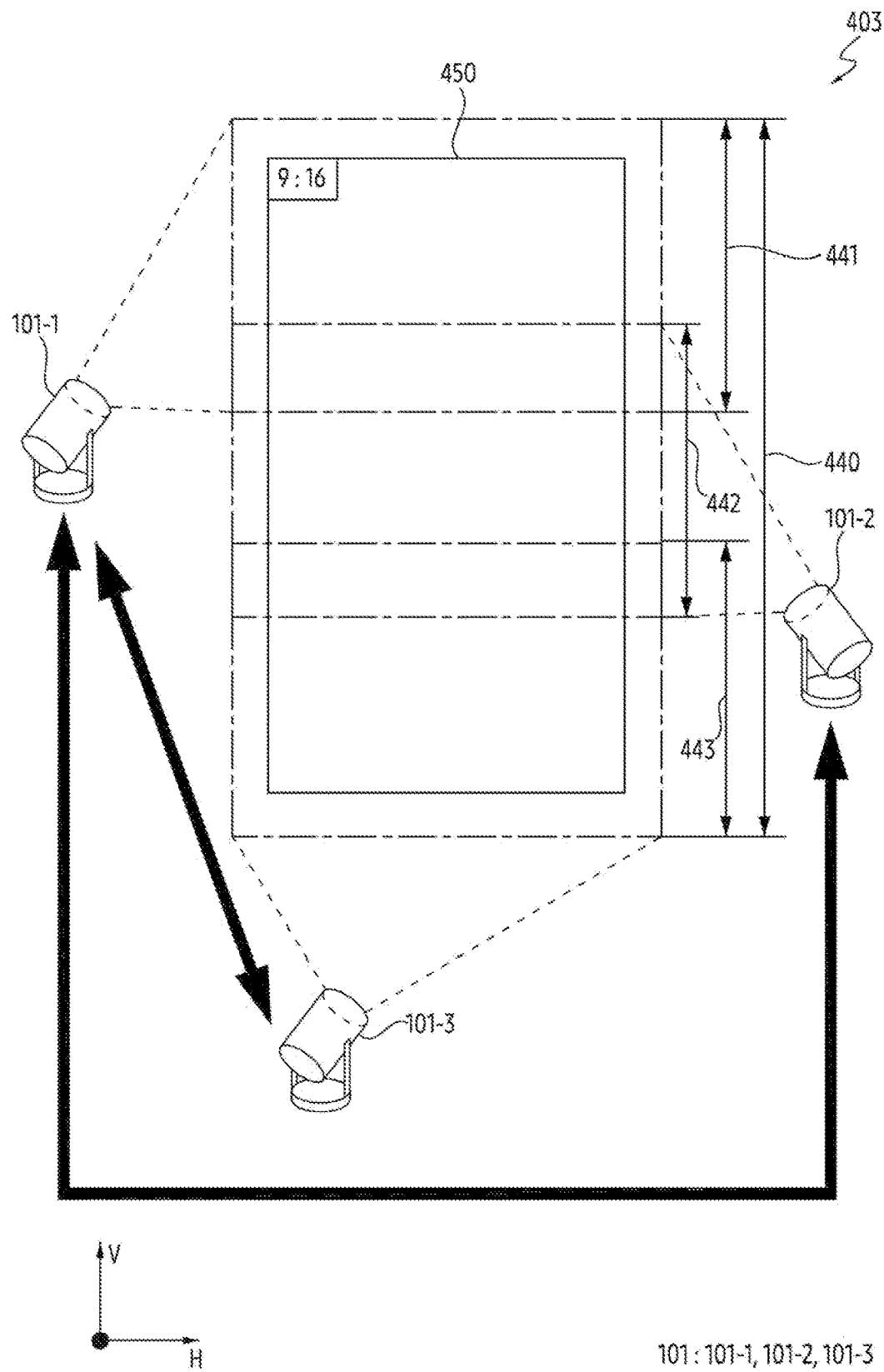

FIGS. 4A to 4C illustrate an example of an operation in which an electronic device 101 generates a third projection area 114 larger than a projection area formed by the electronic device 101 by communicating with at least one external electronic device, according to an embodiment. The electronic devices 101 of FIGS. 1 to 2 may include the electronic devices 101 of FIGS. 4A to 4C. For example, the description of the electronic device 101 described with reference to FIGS. 4A to 4C may be performed by the electronic device 101 and/or a processor 210 of FIGS. 1 to 2.

In FIG. 4A, an exemplary state 401 in which a first electronic device 101-1 having a form factor of a beam projector formed a third projection area 114 by communicating with a second electronic device 101-2 is illustrated. The state 401 may include states 301 and 302 of FIGS. 3A to 3B. For example, the third projection area 114 may include the third projection area 114 of FIG. 3C. According to an embodiment, the first electronic device 101-1 may display visual objects 120, 130, and 410 having a rectangular shape in the third projection area 114, by controlling the projection assemblies (e.g., a projection assembly 225 of FIG. 2) of the first electronic device 101-1 and the second electronic device 101-2, in response to an input for forming the third projection area 114 by using the reference aspect ratio.

In the state 401 of FIG. 4A, the visual objects 120, 130, and 410 representing three reference aspect ratios are exemplarily illustrated. The visual object 120 may have a rectangular shape having a reference aspect ratio of 2.35:1. The first electronic device 101-1 may display a text (e.g., "2.35:1") indicating a reference aspect ratio at one vertex of the visual object 120. Similarly, the first electronic device 101-1 may display the visual object 410 having a reference aspect ratio of 1.85:1 in the third projection area 114. The first electronic device 101-1 may display text (e.g., "1.85:1") for guiding the reference aspect ratio corresponding to the visual object 410 at one vertex of the visual object 410. The first electronic device 101-1 may display the visual object 130 having a reference aspect ratio of 16:9, based on cooperative control of the first electronic device 101-1 and the second electronic device 101-2 connected to each other. The reference aspect ratio guided by the first electronic device 101-1 is not limited to the reference aspect ratios of the visual objects 120, 130, and 410. For example, the first electronic device 101-1 may display a visual object based on at least one of the reference aspect ratios of Table 1.

TABLE 1

| Reference aspect ratio | Type |
| --- | --- |
| 2.35:1 | movie (cinemascope) |
| 1.85:1 | wide screen (or letter box) |
| 16:9 (or 1.78:1) | high definition TV (HDTV) |
| 1.48:1 | 2 * 2 standard slide (35 mm DF) |
| 4:3 (or 1.33:1) | NTSC/PAL video and/or most data graphics |
| 5:4 (or 1.25:1) | high definition data graphics |
| 1:1 | opaque projection |

In Table 1, according to an embodiment, the first electronic device 101-1 may recommend media content having a type corresponding to the reference aspect ratio of the third projection area 114 to the user. For example, in a case that the reference aspect ratio of the third projection area 114 corresponds to 2.35:1, the first electronic device 101-1 may display media content classified as the movie to the user. For example, in a case that the reference aspect ratio of the third projection area 114 corresponds to 1.85:1, the first electronic device 101-1 may display a UI in which one or more media contents classified as the wide screen are listed.

Although the state 401 in which the two beam projectors operate based on the relationship between the master beam projector (e.g., the first electronic device 101-1) and the slave beam projector (e.g., the second electronic device 101-2) is illustrated, but the embodiment is not limited thereto. In FIG. 4B, a state 402 in which three beam projectors (e.g., the first electronic device 101-1 to the third electronic device 101-3) are connected to each other is illustrated. In the state 402, the first electronic device 101-1 operating as the master beam projector may communicate with a plurality of slide beam projectors (e.g., the second electronic device 101-2 and/or the third electronic device 101-3).

In FIG. 4B, in the state 402, the first electronic device 101-1 may identify a first projection area 421, a second projection area 422, a third projection area 423 overlapped each other by overlapping areas 431 and 433. Depending on a position relationship between the first electronic device 101-1 to the third electronic device 101-3, an overlapping area 431 in which the first projection area 421 and the third projection area 423 overlap each other, an overlapping area 433 in which the second projection area 422 and the third projection area 423 overlap each other, and an overlapping area 432 in which all of the first projection area 421 to the third projection area 423 overlap each other may be formed.

In the state 402 in which two slave beam projectors (e.g., the second electronic device 101-2 and the third electronic device 101-3) are connected to each other, the first electronic device 101-1 may display at least one visual object for guiding at least one reference aspect ratio in the third projection area 114, by controlling the projection assembly of the first electronic device 101-1 and the projection assemblies of the slave beam projectors. In the exemplary state 402 of FIG. 4B, in which the third projection area 114 is formed by a combination of projection areas of different beam projectors, the first electronic device 101-1 may display the visual objects 120, 130, and 410 having different reference aspect ratios (e.g., 2.35:1, 1.85:1, 16:9) in the third projection area 114. In the state 402, the first electronic device 101-1 which identified that the aspect ratio of the third projection area 114 matches the reference aspect ratio represented by any one of the visual objects 120, 130, and 410 may replace the screen in which visual objects 120, 130, 410 displayed, with a list of one or more media contents having the reference aspect ratio.

Although beam projectors forming projection areas partially overlapped each other in the horizontal direction H have been described, the embodiment is not limited thereto. In FIG. 4C, according to an embodiment, the first projection area 441 to the third projection area 443 of the first electronic device 101-1 to the third electronic device 101-3 may overlap each other along the vertical direction V. In a state 403 in which the first projection area 441 to the third projection area 443 overlapped along the vertical direction V are identified, the first electronic device 101-1 may display a visual object 450 for guiding the reference aspect ratio (e.g., 9:16) in the projection area 440 formed by a combination of the first projection area 441 to the third projection area 443. The first electronic device 101-1 may make the shape of the visual object 450 to be maintained independently of the motion of at least one of the first electronic devices 101-1 to the third electronic device 101-3.

In the state 403 of FIG. 4C, the first electronic device 101-1 may identify whether the aspect ratio of the projection area 440 matches the reference aspect ratio corresponding to the visual object 450. In a case that the aspect ratio of the projection area 440 matches the reference aspect ratio of the visual object 450, the first electronic device 101-1 may display the UI having the reference aspect ratio, by controlling the second electronic device 101-2 and the third electronic device 101-3. For example, the first electronic device 101-1 may mirror a screen of a mobile phone formed along the vertical direction V, such as a portrait mode.

Figure 4D:
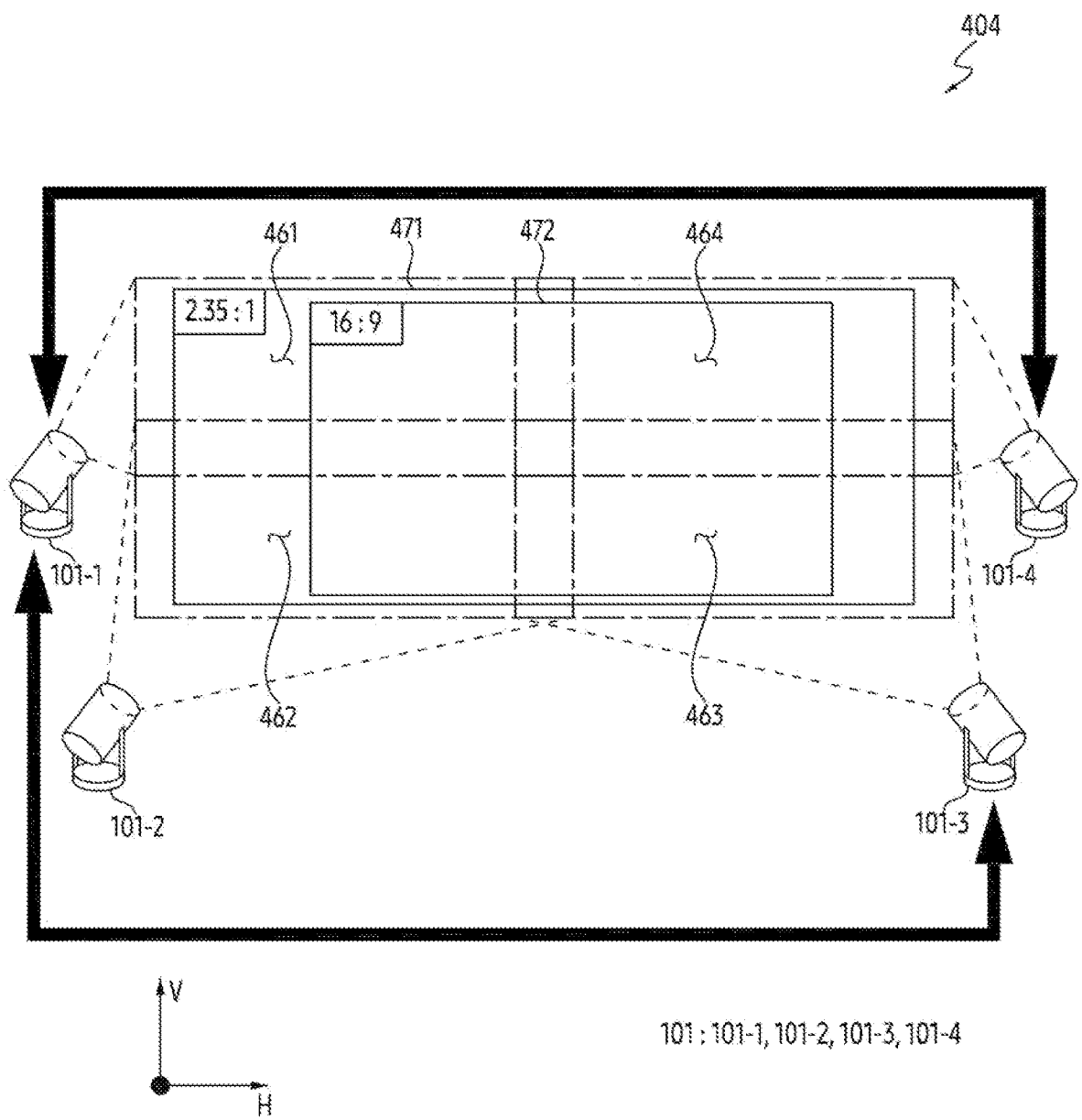

In FIG. 4D, a state 404 in which projection areas 461, 462, 463, and 464 of the first electronic device 101-1 to the fourth electronic device 101-4 are partially overlapped is illustrated. In the state 404, the first electronic device 101-1 may display visual objects 471 and 472 for guiding an aspect ratio of a combination of the projection areas 461, 462, 463, and 464, by controlling the second electronic device 101-2 to the fourth electronic device 101-4. In the state 404, the aspect ratio of the combination may match an aspect ratio of any one of the visual objects 471 and 472, based on the rotational movement and/or parallel movement of at least one of the first electronic devices 101-1 to the fourth electronic devices 101-4. In a case that the aspect ratio of the combination of the projection areas 461, 462, 463, and 464 matches the reference aspect ratio of any one of the visual objects 471 and 472, the first electronic device 101-1 may display media content having a reference aspect ratio matching the combination.

Hereinafter, with reference to FIGS. 5A to 5B, an example of an operation in which the first electronic device 101-1 displays media content and/or UI having an aspect ratio of the projection area in a projection area formed by a plurality of electronic devices including the first electronic device 101-1 will be described.

Figure 5A:
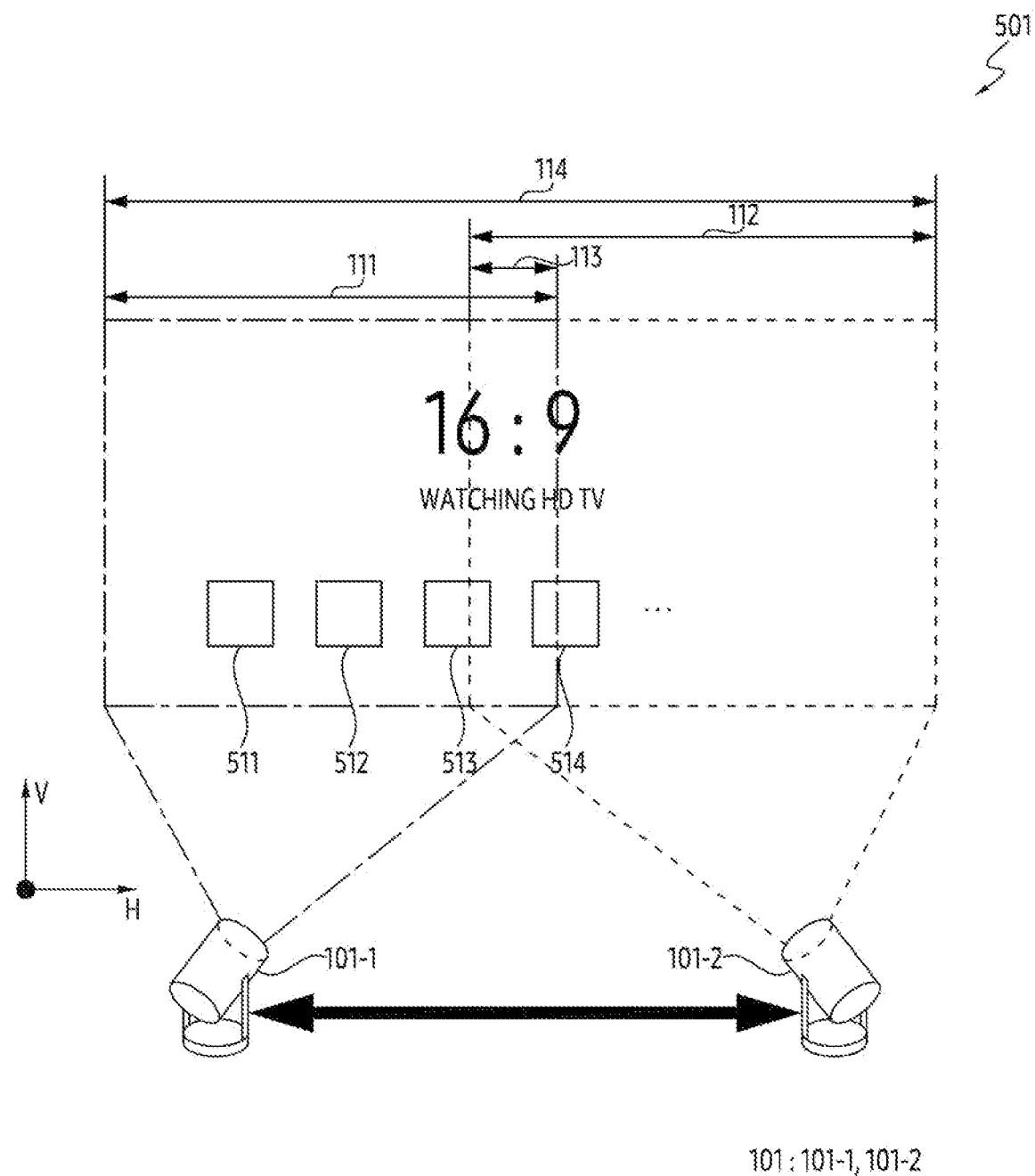
FIGS. 5A and 5B illustrate an example of an operation of displaying media content having a reference aspect ratio in a projection area formed by a first electronic device together with a second electronic device, according to an embodiment.
Figure 5B:
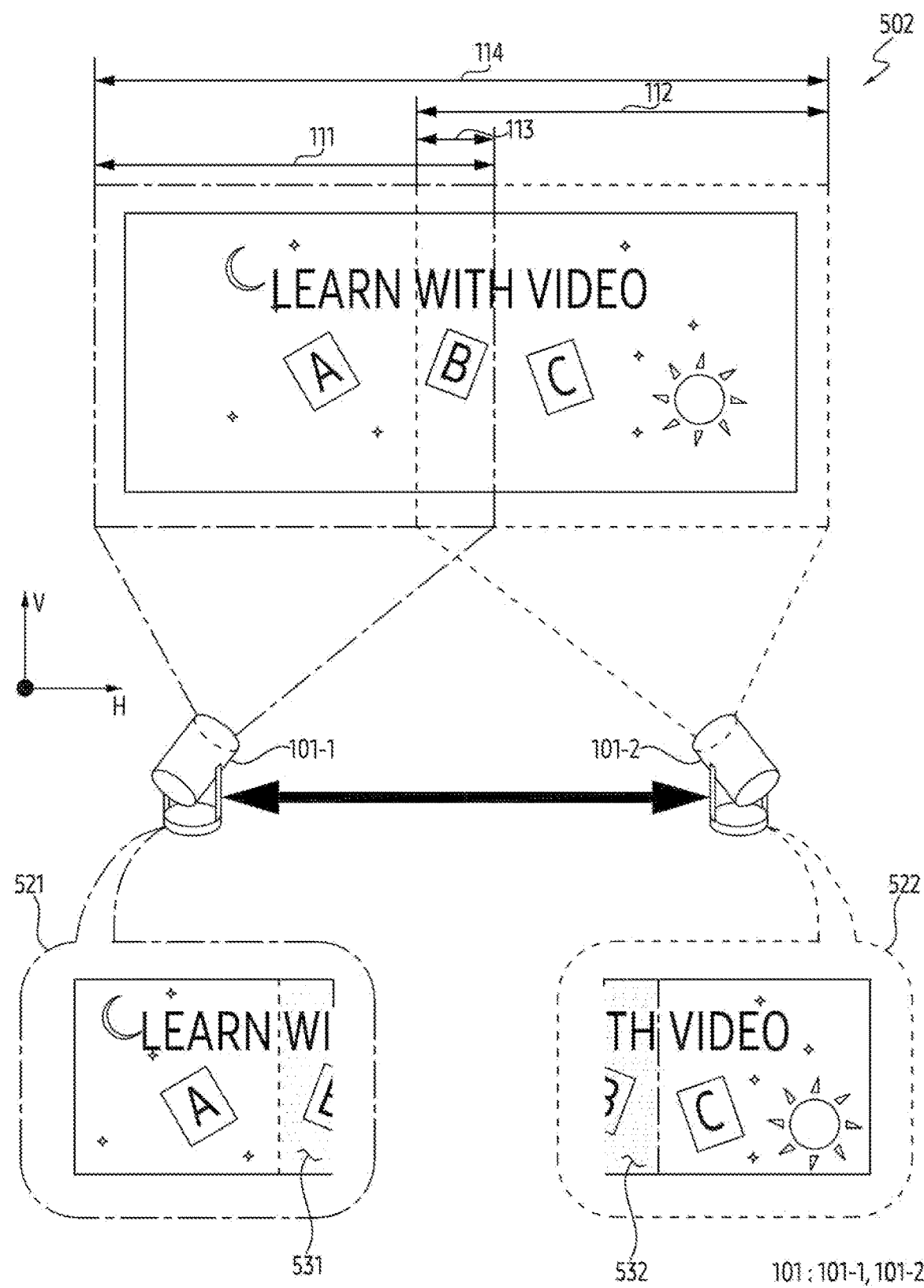

FIGS. 5A to 5B illustrate an example of an operation of displaying media content having a reference aspect ratio in a third projection area 114 formed by a first electronic device 101-1 together with a second electronic device 101-2, according to an embodiment. An electronic device 101 of FIGS. 1 to 2 may include the first electronic device 101-1 and the second electronic device 101-2 of FIGS. 5A to 5B. Operations of the first electronic device 101-1 and the second electronic device 101-2 described with reference to FIGS. 5A to 5B may be performed by the electronic device 101 and/or a processor 210 of FIG. 2.

In FIG. 5A, in a state 501 in which a first projection area 111 of the first electronic device 101-1 and a second projection area 112 of the second electronic device 101-2 are combined in the horizontal direction H, the first electronic device 101-1 may display a UI having an aspect ratio of the third projection area 114 in the third projection area 114 formed by a combination of the first projection area 111 and the second projection area 112, by controlling the second electronic device 101-2. In the state 501 of FIG. 5A, in a case that the aspect ratio of the third projection area 114 has a reference aspect ratio of 16:9, based on Table 1, the first electronic device 101-1 may display a list of one or more media contents classified as HDTV in the third projection area 114. In the third projection area 114, the first electronic device 101-1 may display icons 511, 512, 513, and 514 of different media contents. In response to an input indicating the selection of any one of the icons 511, 512, 513, and 514, the first electronic device 101-1 may play media content selected by the input in the third projection area 114, by controlling the second electronic device 101-2.

In FIG. 5B, an exemplary a state 502 in which the first electronic device 101-1 and the second electronic device 101-2 play the media content having the reference aspect ratio in the third projection area 114 is illustrated. In the state 502 in which the first projection area 111 and the second projection area 112 are connected to each other by the overlapping area 113, the first electronic device 101-1 may project a first beam 521 to the first projection area 111, and the second electronic device 101-2 may project a second beam 522 to the second projection area 112. The first electronic device 101-1 may adjust the keystone of the first beam 521 based on the shape and/or size of the first projection area 111 in the third projection area 114. The second electronic device 101-2 may adjust the keystone of the second beam 522 based on the shape and/or size of the second projection area 112 in the third projection area 114.

In an embodiment, in order to equalize the distribution of brightness in the third projection area 114, the first electronic device 101-1 and the second electronic device 101-2 may perform edge blending on the first beam 521 and the second beam 522. For example, the first electronic device 101-1 may make the brightness of the portion 531 darker than the brightness of another portion of the first beam 521, by performing edge blending on the portion 531 of the first beam 521 corresponding to the overlapping area 113. For example, the second electronic device 101-2 may make the brightness of the portion 532 darker than the brightness of another portion of the second beam 522, by performing edge blending on the portion 532 of the second beam 522 corresponding to the overlapping area 113.

Although the operation of the first electronic device 101-1 recommending the media content based on the reference aspect ratio of 16:9 has been exemplarily described, the embodiment is not limited thereto. For example, the first electronic device 101-1 may recommend and/or play the playback of media content classified as a movie in a projection area having a reference aspect ratio of 2.35:1. For example, the first electronic device 101-1 may provide and/or recommend media content having a reference aspect ratio of 1.85:1 to a projection area having the reference aspect ratio of 1.85:1. For example, in a projection area having a reference aspect ratio of 9:16, the first electronic device 101-1 may display and/or recommend a photo of a portrait mode (or vertical mode). For example, in a projection area having a reference aspect ratio of 9:18, the first electronic device 101-1 may display a UI based on mirroring of a terminal (e.g., a terminal 102 of FIG. 1) or may recommend the mirroring.

Hereinafter, an operation of the above-described master beam projector (e.g., the first electronic device 101-1) and one or more slave beam projectors will be described with reference to FIG. 6.

Figure 6:
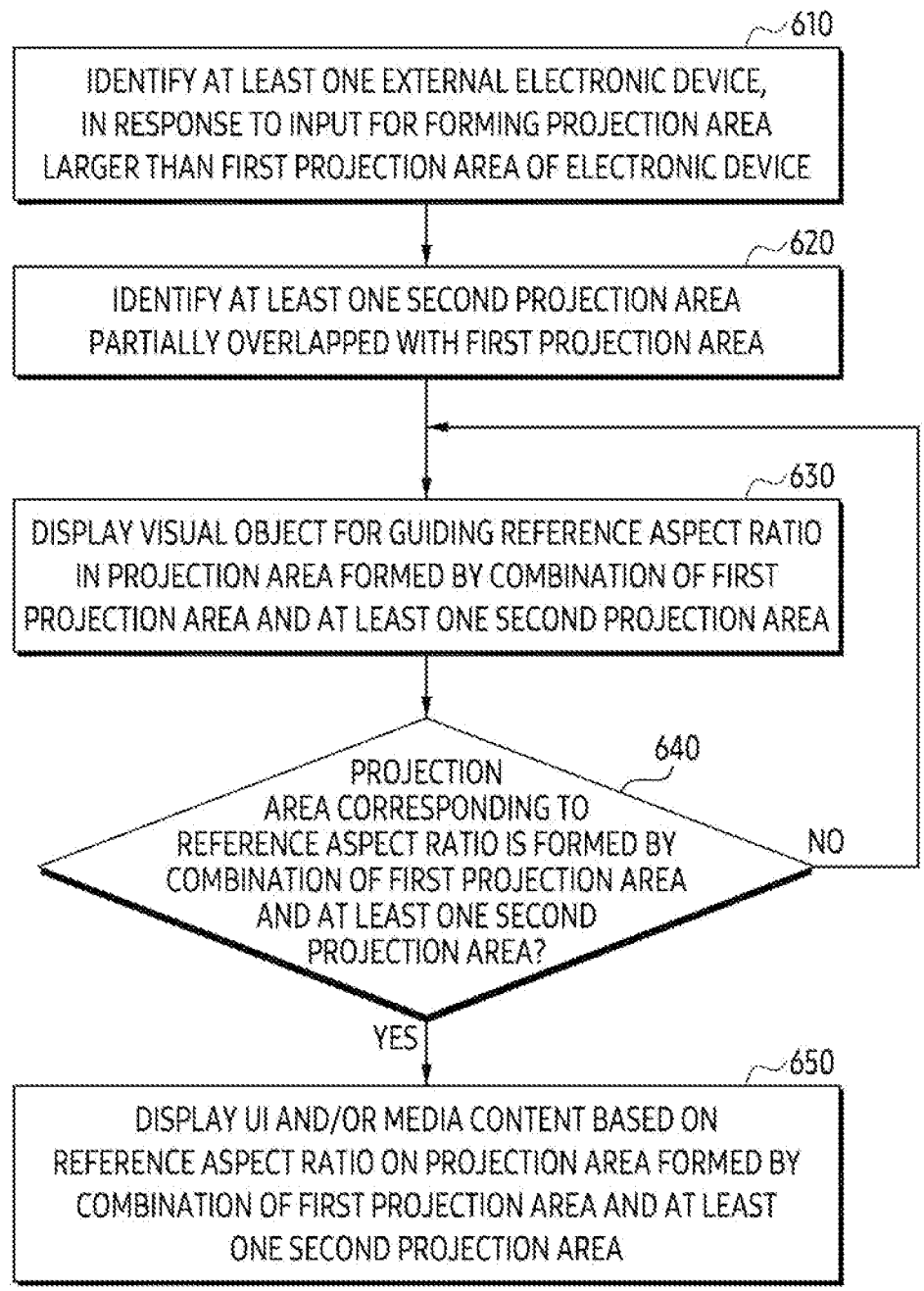
FIG. 6 illustrates an example of a flowchart for an electronic device, according to an embodiment.

FIG. 6 illustrates an example of a flowchart for an electronic device, according to an embodiment. A first electronic device 101-1 (or master beam projector) of FIGS. 1 and 2 may include the electronic device of FIG. 6. At least one of operations of FIG. 6 may be performed by the first electronic device 101-1 and/or a processor 210 of FIG. 2.

In FIG. 6, in operation 610, according to an embodiment, the electronic device may identify at least one external electronic device, in response to an input for forming a projection area (e.g., a third projection area 114 of FIG. 1) larger than a first projection area (e.g., a first projection area 111 of FIG. 1) of the electronic device. The input may be received by a button of the electronic device and/or a selection of an option of the menu or may be received through a terminal (e.g., a terminal 102 of FIG. 1) connected to the electronic device. Based on the above input, the electronic device may identify another projection area connected to the first projection area, and/or may identify an external electronic device corresponding to the other projection area, by using a communication circuit (e.g., a communication circuit 220-1 of FIG. 2).

In FIG. 6, in operation 620, according to an embodiment, the electronic device may identify at least one second projection area partially overlapped with the first projection area. The electronic device may identify the at least one second projection area, based on an image obtained through a camera positioned toward the first projection area. The camera may be included in the electronic device or may be included in a terminal connected to the electronic device. The at least one second projection area may form an overlapping area at least partially overlapping with the first projection area, such as the second projection area 112 of FIG. 1.

In FIG. 6, in operation 630, according to an embodiment, the electronic device may display a visual object (e.g., a visual object 130 of FIG. 1) for guiding the reference aspect ratio in a projection area formed by a combination of the first projection area and at least one second projection area. The electronic device may display at least a portion (e.g., a first portion 130-1 of FIG. 1) of the visual object, by controlling a projection assembly (e.g., a projection assembly 225 of FIG. 2) of the electronic device. The electronic device may transmit information for displaying another portion (e.g., a second portion 130-2 of FIG. 1) overlapped at least partially with the portion of the visual object displayed in the first projection area, to at least one external electronic device identified by the operation 610. The visual object may guide the movement of the electronic device and/or at least one external electronic device, to a user viewing the first projection area and/or at least one second projection area. For example, the user may move the electronic device and/or at least one external electronic device so that the combination of the first projection area and at least one second projection area has the shape represented by the visual object.

In FIG. 6, in operation 640, according to an embodiment, the electronic device may identify whether a projection area corresponding to the reference aspect ratio is formed by the combination of the first projection area and at least one second projection area. For example, the electronic device may identify the aspect ratio of the projection area formed by the combination of the first projection area and the at least one second projection area, by using a camera of the electronic device and/or a camera of the terminal connected to the electronic device. In a case that the identified aspect ratio does not correspond to the reference aspect ratio of the operation 630 (640—No), the electronic device may maintain identifying the aspect ratio.

In a state in which it has been identified based on the operation 640 that the projection area corresponding to the reference aspect ratio is formed by the combination of the first projection area and at least one second projection area (640—Yes), the electronic device may display UI and/or media content based on the reference aspect ratio on the projection area formed by the combination of the first projection area and at least one second projection area, by performing operation 650. The electronic device may display the UI having the reference aspect ratio or may recommend the media content having the reference aspect ratio to a user, based on the above-described operation with reference to FIGS. 5A to 5B.

Figure 7:
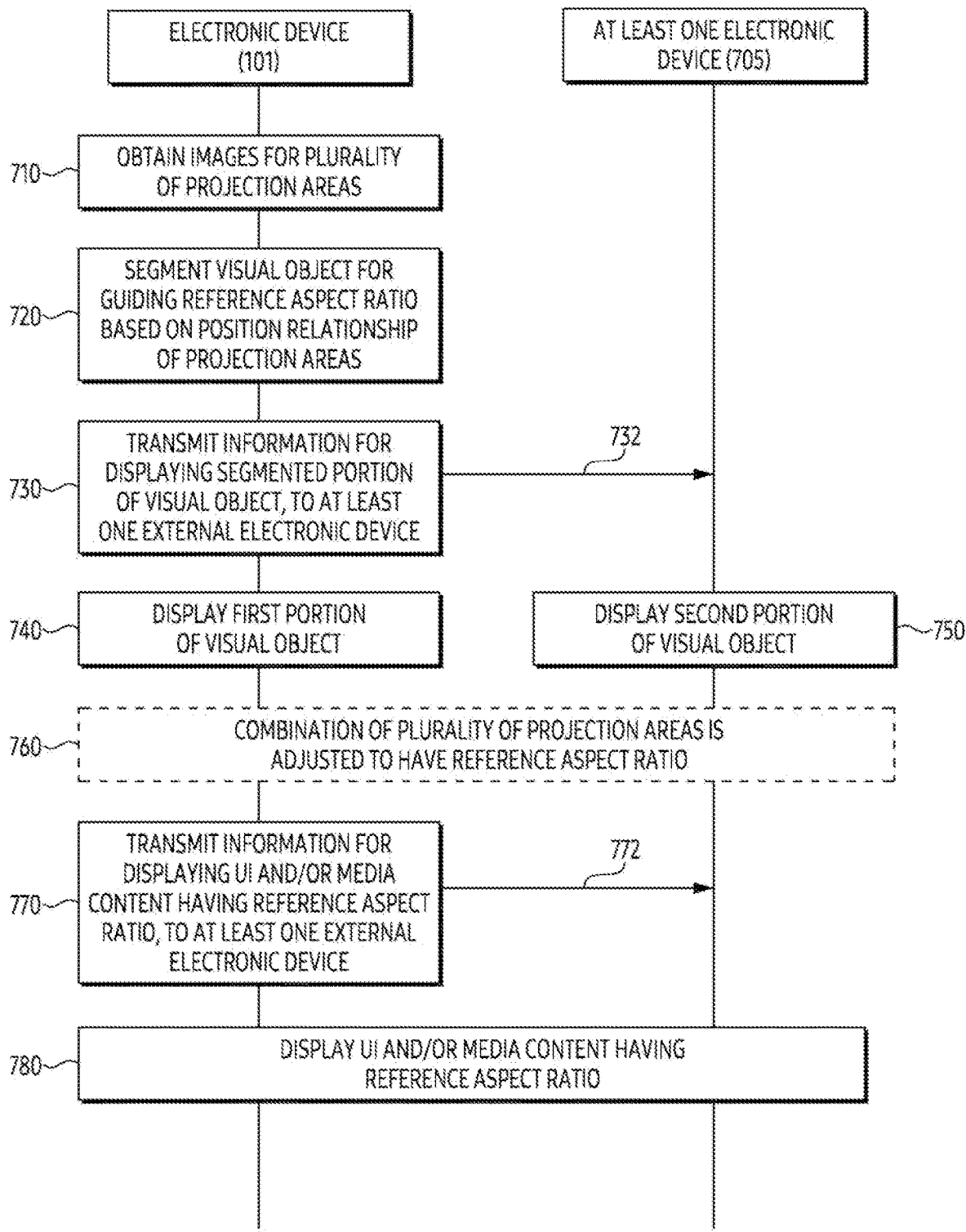
FIG. 7 illustrates an example of a signal flowchart for information exchanged by an electronic device and at least one external electronic device, according to an embodiment.

FIG. 7 illustrates an example of a signal flowchart for information exchanged by an electronic device 101 and at least one external electronic device 705, according to an embodiment. The electronic device 101 of FIG. 7 may include the first electronic device 101-1 of FIG. 1. In one embodiment, the at least one external electronic device 705 of FIG. 7 may include the second electronic device 101-2 of FIG. 1. In one embodiment, at least one external electronic device 705 of FIG. 7 may also include the third electronic device 101-3.

In FIG. 7, in operation 710, according to an embodiment, the electronic device 101 may obtain images for a plurality of projection areas. The plurality of projection areas may be formed by beams emitted by each of the electronic device 101 and the at least one external electronic device 705. The plurality of projection areas may be at least partially overlapping one surface of an external object.

In FIG. 7, in operation 720, according to an embodiment, the electronic device 101 may segment a visual object for guiding the reference aspect ratio based on a position relationship of the projection areas. The electronic device 101 may segment a rectangular visual object having the reference aspect ratio based on the location and/or size of each of the projection areas in the image of the operation 710, such as a first portion 130-1 and a second portion 130-2 of the visual object 130 of FIG. 1.

In FIG. 7, in operation 730, according to an embodiment, the electronic device 101 may transmit information 732 for displaying the segmented portion of the visual object, to at least one external electronic device. The electronic device 101 may transmit the information 732 for displaying each portion of the visual object segmented by the operation 720, to the at least one external electronic device 705.

In FIG. 7, in operation 740, according to an embodiment, the electronic device 101 may display a first portion of the visual object. The first portion may be a portion corresponding to the electronic device 101 in the visual object of the operation 720. In a state in which the electronic device 101 displays the first portion, the at least one external electronic device 705 may display a second portion of the visual object by performing operation 750. Based on the information 732 indicating the location and/or size of the second portion, the at least one external electronic device 705 may display the second portion of the visual object. The operations 740 and 750 may be performed substantially simultaneously by different electronic devices (e.g., the electronic device 101 and the at least one external electronic device 705).

In FIG. 7, in operation 760, according to an embodiment, the electronic device 101 may identify that a combination of a plurality of projection areas is adjusted to have the reference aspect ratio. For example, a user viewing the plurality of projection areas may move and/or rotate the electronic device 101 and/or the at least one external electronic device 705 according to the aspect ratio of the visual object displayed by the operations 740 and 750. In response to movement and/or rotation of the electronic device 101 and/or the at least one external electronic device 705, the electronic device 101 and/or the at least one external electronic device 705 may perform an operation for maintaining the shape of the visual object in the projection area.

In FIG. 7, in operation 770, according to an embodiment, the electronic device 101 may transmit information 772 for displaying the UI and/or the media content having the reference aspect ratio, to the at least one external electronic device 705. For example, after the combination of the plurality of projection areas is adjusted to have the reference aspect ratio, the electronic device 101 may transmit the information 772, to the at least one external electronic device 705.

In FIG. 7, in operation 780, according to an embodiment, electronic device 101 may display the UI and/or the media content having the reference aspect ratio. The electronic device 101 may selectively display a portion corresponding to the projection area of the electronic device 101 in the media content. The at least one external electronic device 705 may selectively display a portion of the media content indicated by the information 772.

The electronic device according to an embodiment described with reference to FIGS. 1 to 7 may be associated with a metaverse service. Hereinafter, an example of the metaverse service provided to the user based on a wearable device according to an embodiment will be described with reference to FIG. 8.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR that is cutting-edge technology that enables people to experience real-life experiences in a computerized virtual world), but also social and cultural activities like real reality. Metaverse service may provide media content to enhance immersion in the virtual world, based on augmented reality (AR), virtual reality environment (VR), mixed environment (MR), and/or extended reality (XR).

For example, the media content provided by metaverse service may include social interaction content including a game, a concert, a party, and/or a conference based on an avatar. For example, the media content may include information for economic activities such as advertising, user-created content, and/or sales of products and/or shopping. Ownership of the user-created content may be proved by a blockchain-based non-fungible token (NFT). The metaverse service may support economic activities based on real money and/or cryptocurrency. Virtual content linked to the real world, such as digital twin or life logging, may be provided by the metaverse service.

Figure 8:
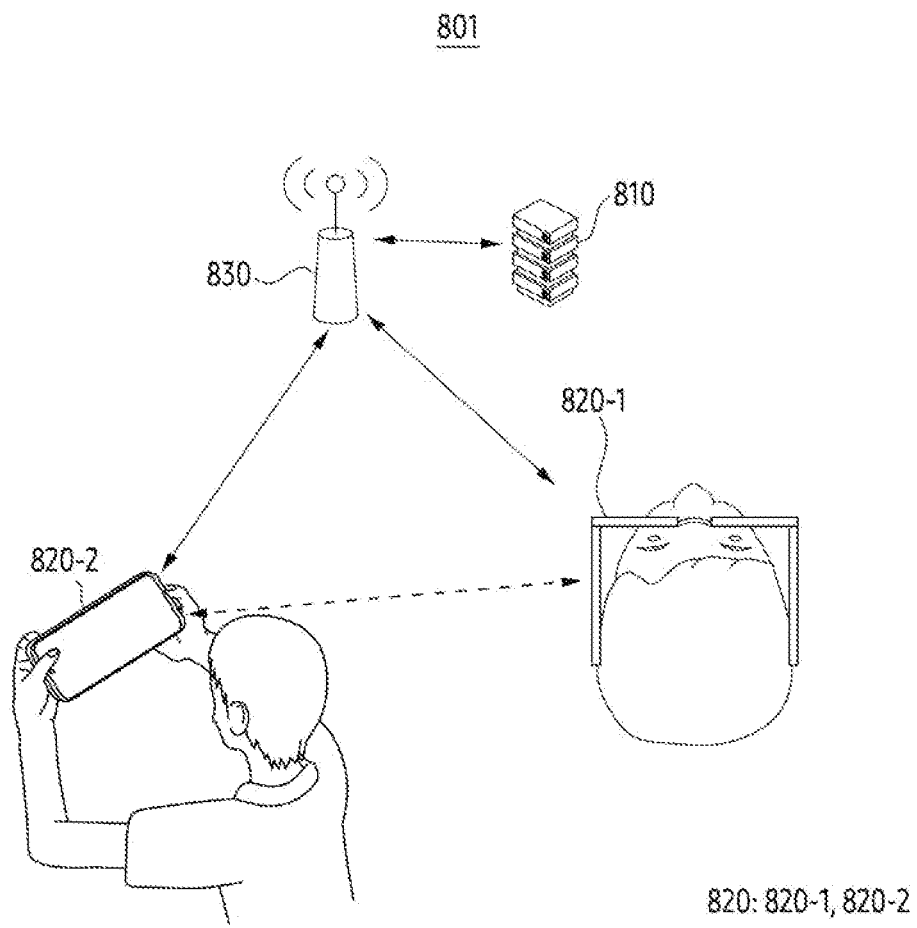
FIG. 8 is an exemplary diagram of a network environment associated with a metaverse service.

FIG. 8 is an exemplary diagram of a network environment 801 that receives a metaverse service through a server 810.

In FIG. 8, the network environment 801 may include a server 810, a user terminal 820 (e.g., a first terminal 820-1 and a second terminal 820-2), and a network connecting the server 810 and the user terminal 820. In the network environment 801, the server 810 may provide a metaverse service to the user terminal 820. The network may be formed by at least one intermediate node 830 including an access point (AP) and/or a base station. The user terminal 820 may access the server 810 through a network and output a user interface (UI) associated with the metaverse service to the user of the user terminal 820. Based on the UI, the user terminal 820 may obtain information to be inputted into the metaverse service from the user or output information associated with the metaverse service (e.g., multimedia content) to the user.

In this case, the server 810 provides a virtual space so that the user terminal 820 may perform activities in the virtual space. In addition, the user terminal 820 may represent information provided by the server 810 to the user or transmit information in which the user wants to represent in the virtual space to the server, by installing S/W agent to access a virtual space provided by the server 810. The S/W agent may be provided directly through the server 810, downloaded from a public server, or embedded and provided when purchasing a terminal.

In an embodiment, the metaverse service may be provided to the user terminal 820 and/or the user by using the server 810. The embodiment is not limited thereto, and the metaverse service may be provided through individual contact between users. For example, within the network environment 801, the metaverse service may be provided by a direct connection between the first terminal 820-1 and the second terminal 820-2, independently of the server 810. In FIG. 8, in the network environment 801, the first terminal 820-1 and the second terminal 820-2 may be connected to each other through a network formed by at least one intermediate node 830. In an embodiment where the first terminal 820-1 and the second terminal 820-2 are directly connected, any one user terminal of the first terminal 820-1 and the second terminal 820-2 may serve as the server 810. For example, a metaverse environment may be configured only with a device-to-device connection (e.g., a peer-to-peer (P2P) connection).

In an embodiment, the user terminal 820 (or the user terminal 820 including the first terminal 820-1 and the second terminal 820-2) may be made into various form factors, and may be characterized by including an input device for inputting information to the metaverse service and an output device that provides video and/or sound to the user. Examples of various form factors of the user terminal 820 include a smartphone (e.g., the second terminal 820-2), an AR device (e.g., the first terminal 820-1), a VR device, an MR device, a video see through (VST) device, an optical see through (OST) device, a smart lens, a smart mirror, a TV or a projector capable of input/output.

Network (e.g., a network formed by at least one intermediate node 830) include various broadband networks including 3G, 4G, and 5G, a short-range networks including Wi-Fi and Bluetooth (e.g., a wired network or a wireless network that directly connect the first terminal 820-1 and the second terminal 820-2).

In an embodiment, the user terminal 820 of FIG. 8 may include the electronic device 101 of FIGS. 1 to 2.

In an embodiment, a method of forming a projection area having a reference aspect ratio may be required by using an electronic device and an external electronic device. As described above, according to an embodiment, an electronic device (e.g., an electronic device 101 of FIGS. 1 to 7) may include a sensor (e.g., a sensor 230 of FIG. 2), a communication circuit (e.g., a communication circuit 220-1 of FIG. 2), a projection assembly (e.g., a projection assembly 225 of FIG. 2), and a processor (e.g., a processor 210-1 of FIG. 2). The processor may be configured to identify, based on an identification of an external electronic device through the communication circuit, a combination of a first projection area (e.g., a first projection area 111 of FIG. 1) where light of the projection assembly is projected and a second projection area (e.g., a second projection area 112 of FIG. 1) where light of (a projection assembly of) the external electronic device is projected. The processor may be configured to display a portion of a visual object (e.g., visual objects 120 and 130 of FIG. 1) for guiding a reference aspect ratio in the first projection area. The portion may be segmented from the visual object based on a location of the first projection area in the combination. The processor may be configured to, based on identifying a motion of the electronic device based on data of the sensor, adjust the portion of the visual object displayed in the first projection area. The processor may be configured to, based on identifying an aspect ratio of a projection area formed by the combination corresponding to the reference aspect ratio, display at least portion of media content having the reference aspect ratio in the first projection area. According to an embodiment, the electronic device may adjust an aspect ratio of a combination of a plurality of projection areas to a reference aspect ratio, and may display media content having the reference aspect ratio.

For example, the processor may be configured to, in a state displaying a portion of the visual object, transmit, to the external electronic device through the communication circuit, a signal for displaying another portion of the visual object.

For example, the processor may be configured to segment, in the visual object of a rectangular having a width or a height of the combination of the first projection area and the second projection area and having the reference aspect ratio, the portion to be displayed through the first projection area.

For example, the processor may be configured to, based on identifying the second projection area at least partially overlapping to the first projection area in an image received through the communication circuit, display the portion of the visual object.

For example, the processor may be configured to receive, from another external electronic device different from the external electronic device through the communication circuit, the image.

For example, the processor may be configured to, based on identifying the combination larger than the first projection area, based on a location of the first projection area in the combination, selectively display the portion of the visual object.

For example, the processor may be configured to initiate, in response to an input to form a projection area larger than the first projection area, identifying the external electronic device by using the communication circuit.

For example, the processor may be configured to adjust brightness of a first portion in the first projection area to which is overlapped to the second projection area, to another brightness different from brightness of second portion of the first projection area that is distinct from the first portion.

As described above, according to an embodiment, a method of an electronic device may comprise identifying, based on identifying an external electronic device through a communication circuit of the electronic device, a combination of a first projection area where light of a projection assembly of the electronic device is projected and a second projection area where light of (a projection assembly of) the external electronic device is projected. The method may comprise displaying a portion of a visual object for guiding a reference aspect ratio in the first projection area. The portion may be segmented from the visual object based on a location of the first projection area in the combination. The method may comprise adjusting, based on identifying a motion of the electronic device based on data of a sensor of the electronic device, the portion of the visual object displayed in the first projection area. The method may comprise displaying, based on identifying an aspect ratio of a projection area formed by the combination corresponding to the reference aspect ratio, at least portion of media content having the reference aspect ratio in the first projection area.

For example, the displaying the portion of the visual object may comprise transmitting, to the external electronic device through the communication circuit, a signal for displaying another portion of the visual object.

For example, the displaying the portion of the visual object may comprise segmenting, in the visual object of a rectangular having a width or a height of the combination of the first projection area and the second projection area and having the reference aspect ratio, the portion to be displayed through the first projection area.

For example, the displaying the portion of the visual object may comprise displaying, based on identifying the second projection area at least partially overlapping to the first projection area in an image received through the communication circuit, the portion of the visual object.

For example, the identifying may comprise receiving, from another external electronic device different from the external electronic device through the communication circuit, the image.

For example, the displaying the portion of the visual object may comprise, based on identifying the combination larger than the first projection area, selectively displaying, based on a location of the first projection area in the combination, the portion of the visual object.

For example, the identifying may comprise initiating, in response to an input to form a projection area larger than the first projection area, identifying the external electronic device by using the communication circuit.

For example, the identifying may comprise adjusting brightness of a first portion in the first projection area to which is overlapped to the second projection area, to another brightness different from brightness of second portion of the first projection area that is distinct from the first portion.

As described above, according to an embodiment, an electronic device may comprise a sensor, a camera, a communication circuit, a projection assembly, and a processor. The processor may be configured to identify, in response to an input for forming a projection area larger than a first projection area of the projection assembly, an external electronic device by using the communication circuit. The processor may be configured to obtain, in response to the input, an image from the camera positioned toward a direction to which the projection assembly is directed. The processor may be configured to, based on identifying a second projection area at least partially overlapping the first projection area in the image, display a first portion of a visual object for guiding a reference aspect ratio in the first projection area. The processor may be configured to, based on motion of the electronic device identified based on data of the sensor while displaying the first portion of the visual object, adjust the first portion of the visual object displayed through the first projection area. The processor may be configured to, based on identifying a projection area having the reference aspect ratio and formed by a combination of the first projection area and the second projection area, display a portion of media content having the reference aspect ratio on the first projection area.

For example, the processor may be configured to transmit, to the external electronic device through the communication circuit, information for displaying a second portion different from the first portion in the visual object on the second projection area.

For example, the processor may be configured to move, based on identifying the motion moved to a first direction, the first portion displayed in the first projection area along a second direction opposite to the first direction.

For example, the processor may be configured to transmit, in a state displaying the portion of the media content in the first projection area, information for displaying another portion of the media content to the external electronic device.

As described above, according to an embodiment, a method of an electronic device may comprise identifying, in response to an input for forming a projection area larger than a first projection area of the projection assembly of the electronic device, an external electronic device by using the communication circuit of the electronic device. The method may comprise obtaining, in response to the input, an image from the camera of the electronic device positioned toward a direction to which the projection assembly is directed. The method may comprise displaying, based on identifying a second projection area at least partially overlapping the first projection area in the image, a first portion of a visual object for guiding a reference aspect ratio in the first projection area. The method may comprise adjusting, based on motion of the electronic device identified based on data of the sensor of the electronic device while displaying the first portion of the visual object, the first portion of the visual object displayed through the first projection area. The method may comprise displaying, based on identifying a projection area having the reference aspect ratio and formed by a combination of the first projection area and the second projection area, a portion of media content having the reference aspect ratio on the first projection area.

The devices described above may be implemented as a hardware component, a software component, and/or a combination of the hardware component and the software component. For example, the device and component described in the embodiments may be implemented by using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, any other device capable of executing and responding to an instruction. The processing device may perform an operating system (OS) and one or more software applications performed on the operating system. In addition, the processing device may access, store, manipulate, process, and generate data in response to execution of the software. Although one processing device may be described as being used, a person having ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more of them, and may configure the processing device to operate as desired or may instruct the processing device independently or collectively. The software and/or data may be embodied in any type of machine, component, physical device, computer storage medium, or device, to be interpreted by the processing device or to provide the instruction or data to the processing device. The software may be distributed on a network-connected computer system and stored or executed in a distributed manner. The software and data may be stored in one or more computer-readable recording medium.

The method according to the embodiment may be implemented in the form of a program instruction that may be performed through various computer means and recorded in a computer-readable medium. In this case, the medium may continuously store a program executable by a computer or may temporarily store the program for execution or download. In addition, the medium may be various recording means or storage means in the form of a single unit or a combination of several pieces of hardware, but is not limited to a medium directly connected to a certain computer system, and may exist distributed on the network. An example of medium may be configured to store a program instruction, by including magnetic medium such as a hard disk, a floppy disk and a magnetic tape, optical recording medium such as a compact disk read only memory (CD-ROM) and a digital optical disk (DVD), magneto-optical medium such as a floptical disk, a ROM, a RAM, a flash memory, and the like. In addition, an example of another medium may include an app store that distribute an application, a site that supply or distribute various software, and recording medium or storage medium managed by servers.

As described above, although the embodiments have been described by a limited embodiment and a drawing, a person having ordinary knowledge in the relevant technical field may make various modifications and variations from the above description. For example, even if the described techniques are performed in a different order from the described method, and/or components such as the described system, structure, device, circuitry, and the like are coupled or combined in a different form from the described method or are replaced or substituted by another component or equivalent, an appropriate result may be achieved.

Therefore, other implementations, other embodiments, and equivalents of the patents are also in the scope of the claims to be described later.

What is claimed is:

1. An electronic device comprising:
   a sensor;
   communication circuitry;
   a projection assembly;
   memory comprising one or more storage media storing instructions; and
   at least one processor,
   wherein the instructions, when executed by the at least one processor individually or collectively, cause the electronic device to:
   identify, based on an identification of an external electronic device through the communication circuitry, a combination of a first projection area where light of the projection assembly is projected and a second projection area where light of the external electronic device is projected;
   display a first portion of a visual object for guiding a reference aspect ratio in the first projection area, wherein the first portion is segmented from the visual object based on a location of the first projection area in the combination of the first projection area and the second projection area, wherein the visual object comprises the first portion and a second portion;
   identify a motion of the electronic device based on data of the sensor;
   based on the motion of the electronic device identified while displaying the first portion of the visual object, display the second portion of the visual object that is segmented from the visual object based on the location of the first projection area in the combination of the first projection area and the second projection area, that is changed according to the motion; and
   based on identifying an aspect ratio of the combination of the first projection area and the second projection area corresponding to the reference aspect ratio, display at least a portion of media content having the reference aspect ratio in the first projection area.

2. The electronic device of claim 1, wherein the instructions, when executed by the at least one processor individually or collectively, cause the electronic device to, in a state displaying the first portion of the visual object, transmit, to the external electronic device through the communication circuitry, a signal for displaying a third portion of the visual object such that the visual object having the reference aspect ratio is visible within the combination of the first projection area and the second projection area.

3. The electronic device of claim 1, wherein the visual object is a rectangle having a width or a height of the combination of the first projection area and the second projection area,
   wherein the aspect ratio of the visual object corresponds to the reference aspect ratio, and
   wherein the instructions, when executed by the at least one processor individually or collectively, cause the electronic device to adjust the width or the height of the first portion of the visual object in the first projection area.

4. The electronic device of claim 1, wherein the instructions, when executed by the at least one processor individually or collectively, cause the electronic device to:

identify, in an image received through the communication circuitry, the second projection area at least partially overlapping the first projection area, and based on the identified second projection area, display the first portion of the visual object.

5. The electronic device of claim 4, wherein the instructions, when executed by the at least one processor individually or collectively, cause the electronic device to receive, from another external electronic device different from the external electronic device through the communication circuitry, the image.

6. The electronic device of claim 1, wherein the instructions, when executed by the at least one processor individually or collectively, cause the electronic device to:

identify the combination of the first projection area and the second projection area being larger than the first projection area, and based on the location of the first projection area in the identified combination of the first projection area and the second projection area, selectively display the first portion of the visual object.

7. The electronic device of claim 1, wherein the instructions, when executed by the at least one processor individually or collectively, cause the electronic device to, based on an input to form a projection area larger than the first projection area, initiate identifying the external electronic device by using the communication circuitry.

8. The electronic device of claim 1, wherein the instructions, when executed by the at least one processor individually or collectively, cause the electronic device to adjust a first brightness of a first overlapping portion in the first projection area to which is overlapped to the second projection area, to a second brightness, wherein the first brightness is different from the second brightness of a second overlapping portion of the first projection area, and wherein the second overlapping portion is distinct from the first overlapping portion.

9. A method of an electronic device including a sensor, a projection assembly and communication circuitry, the method comprising:

identifying, based on an identification of an external electronic device through the communication circuitry, a combination of a first projection area where light of the projection assembly is projected and a second projection area where light of the external electronic device is projected;

displaying a first portion of a visual object for guiding a reference aspect ratio in the first projection area, wherein the first portion of the visual object corresponds to a location of the first projection area in the combination of the first projection area and the second projection area, wherein the visual object comprises the first portion and a second portion;

identifying a motion of the electronic device based on data of the sensor;

based on the motion of the electronic device identified while displaying the first portion of the visual object, displaying the second portion of the visual object that is segmented from the visual object based on the location of the first projection area in the combination of the first projection area and the second projection area, that is changed according to the motion; and based on identifying an aspect ratio of the combination of the first projection area and the second projection area corresponding to the reference aspect ratio, displaying at least a portion of media content having the reference aspect ratio in the first projection area.

10. The method of claim 9, wherein the displaying the first portion of the visual object comprises transmitting, to the external electronic device through the communication circuitry, a signal for displaying a third portion of the visual object such that the visual object having the reference aspect ratio is visible within the combination of the first projection area and the second projection area.

11. The method of claim 9, wherein the visual object is a rectangle having a width or a height of the combination of the first projection area and the second projection area, wherein the visual object has the reference aspect ratio, and wherein the displaying of the first portion of the visual object comprises adjusting the width or the height of the first portion of the visual object through the first projection area.

12. The method of claim 9, further comprising identifying the second projection area at least partially overlapping the first projection area in an image received through the communication circuitry, wherein the displaying of the first portion of the visual object comprises displaying, based on the identified second projection, the second portion of the visual object.

13. The method of claim 12, wherein the identifying comprises receiving the image from another external electronic device different from the external electronic device through the communication circuitry.

14. The method of claim 9, further comprising identifying the combination of the first projection area and the second projection area being larger than the first projection area, wherein the displaying the first portion of the visual object comprises, based on the identified combination of the first projection area and the second projection area and the location of the first projection area in the identified combination of the first projection area and the second projection area, selectively displaying the first portion of the visual object.

15. The method of claim 9, wherein the identifying comprises based on an input to form a projection area larger than the first projection area, initiating identifying the external electronic device by using the communication circuitry.

16. The method of claim 9, wherein the identifying comprises adjusting a first brightness of a first overlapping portion in the first projection area to which is overlapped to the second projection area, to a second brightness, wherein the second brightness is different from a brightness of a second overlapping portion of the first projection area, and wherein the second overlapping portion is distinct from the first overlapping portion.

17. An electronic device comprising:

a sensor;
a camera;
communication circuitry;
a projection assembly;
memory comprising one or more storage media storing instructions; and
at least one processor,
wherein the instructions, when executed by the at least one processor individually or collectively, cause the electronic device to:

based on an input for forming a projection area larger than a first projection area of the projection assembly, identify an external electronic device by using the communication circuitry;

based on the input, obtain an image from the camera positioned toward a direction to which the projection assembly is directed;

based on identifying a second projection area at least partially overlapping the first projection area in the image, display a first portion of a visual object for guiding a reference aspect ratio in the first projection area, wherein the first portion of the visual object corresponds to a location of the first projection area in a combination of the first projection area and the second projection area, and wherein the visual object comprises the first portion and a second portion;

identify a motion of the electronic device based on data of the sensor;

based on the motion of the electronic device identified while displaying the first portion of the visual object, display the second portion of the visual object that is segmented from the visual object based on the location of the first projection area in the combination of the first projection area and the second projection area, that is changed according to the motion; and based on identifying a projection area having the reference aspect ratio and formed by the combination of the first projection area and the second projection area, display a portion of media content having the reference aspect ratio on the first projection area.

18. The electronic device of claim 17, wherein the instructions, when executed by the at least one processor individually or collectively, cause the electronic device to transmit, to the external electronic device through the communication circuitry, information for displaying a third portion different from the first portion in the visual object on the second projection area.

19. The electronic device of claim 17, wherein the instructions, when executed by the at least one processor individually or collectively, cause the electronic device to, based on identifying the motion moved to a first direction, move the first portion displayed in the first projection area along a second direction opposite to the first direction.

20. The electronic device of claim 17, wherein the instructions, when executed by the at least one processor individually or collectively, cause the electronic device to transmit, in a state displaying the portion of the media content in the first projection area, information for displaying another portion of the media content to the external electronic device.

* * * * *